(12) United States Patent
Heo et al.

(10) Patent No.: US 11,624,437 B2
(45) Date of Patent: Apr. 11, 2023

(54) TRANSMISSION FOR VEHICLE

(71) Applicant: SL Corporation, Daegu (KR)

(72) Inventors: Chun Nyung Heo, Gyeongsan-si (KR); Sung Jin Kim, Gyeongsan-si (KR); Min Soo Kim, Gyeongsan-si (KR); Mi Rae Do, Gyeongsan-si (KR); Gwang Sun Kim, Gyeongsan-si (KR); Jae Seung Hong, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/852,748

(22) Filed: Jun. 29, 2022

(65) Prior Publication Data

US 2023/0003296 A1 Jan. 5, 2023

(30) Foreign Application Priority Data

Jul. 1, 2021 (KR) .................... 10-2021-0086246

(51) Int. Cl.
| | |
|---|---|
| *F16H 61/10* | (2006.01) |
| *F16H 59/10* | (2006.01) |
| *F16H 59/54* | (2006.01) |
| *F16H 59/44* | (2006.01) |
| *F16H 61/32* | (2006.01) |
| *F16H 61/16* | (2006.01) |
| *B60Q 9/00* | (2006.01) |

(52) U.S. Cl.
CPC .......... *F16H 59/105* (2013.01); *F16H 59/44* (2013.01); *F16H 59/54* (2013.01); *F16H 61/16* (2013.01); *F16H 61/32* (2013.01); *B60Q 9/00* (2013.01); *F16H 2061/326* (2013.01)

(58) Field of Classification Search
CPC .... F16H 2061/326; F16H 61/32; F16H 61/16; F16H 59/54; F16H 59/44; F16H 59/105; B60Q 9/00
See application file for complete search history.

(56) References Cited

U.S. PATENT DOCUMENTS

| | | | | |
|---|---|---|---|---|
| 10,017,054 | B2* | 7/2018 | Wu ..................... | B60B 27/0047 |
| 10,617,913 | B2* | 4/2020 | Dhawan ................ | B62M 6/45 |
| 10,675,913 | B2* | 6/2020 | Ebersbach ............. | B62K 25/02 |
| 10,800,485 | B2* | 10/2020 | Kim ..................... | B62M 6/65 |
| 10,811,647 | B2* | 10/2020 | Gu ........................ | B60L 50/66 |
| 10,981,624 | B2* | 4/2021 | Lin ....................... | B60L 53/16 |

(Continued)

*Primary Examiner* — David M Fenstermacher
(74) *Attorney, Agent, or Firm* — United One Law Group LLC; Kongsik Kim; Jhongwoo Peck

(57) ABSTRACT

A transmission for a vehicle includes a transmission shift unit that receives a shift command of the vehicle, a driving unit that generates a driving force for causing the transmission shift unit to be switched between positions, and a controller configured to control the driving unit for causing the transmission shift unit to be switched between the positions depending on whether a preset condition is satisfied. In particular, the driving unit includes a first stator to generate magnetic flux, a first rotor including first inner permanent magnets and second inner permanent magnets and configured to be rotated by the magnetic flux transmitted to the first inner permanent magnets, outer permanent magnets, a second rotor disposed between the second inner permanent magnets and the outer permanent magnets, and a clutch unit disposed between the first rotor and the second rotor.

15 Claims, 28 Drawing Sheets

(56) References Cited

U.S. PATENT DOCUMENTS

| | | | |
|---|---|---|---|
| 11,091,023 B2* | 8/2021 | Yilma | H02K 11/00 |
| 2011/0320096 A1* | 12/2011 | Itazu | F16H 61/12 |
| | | | 701/58 |
| 2015/0233472 A1* | 8/2015 | Kinoshita | B60W 50/0205 |
| | | | 701/53 |
| 2016/0075177 A1* | 3/2016 | Biderman | B60L 58/21 |
| | | | 301/6.5 |
| 2016/0082772 A1* | 3/2016 | Biderman | B60K 7/00 |
| | | | 301/6.5 |
| 2016/0243927 A1* | 8/2016 | Biderman | G07C 5/008 |
| 2020/0169198 A1* | 5/2020 | Cha | B60K 6/442 |
| 2020/0332879 A1* | 10/2020 | Kannou | F16H 63/3466 |
| 2020/0332890 A1* | 10/2020 | Kannou | F16H 63/3466 |
| 2020/0336037 A1* | 10/2020 | Naitou | H02K 5/22 |
| 2021/0116023 A1* | 4/2021 | Nemeth | F16H 61/2807 |
| 2021/0140540 A1* | 5/2021 | Min | F16H 61/32 |

* cited by examiner

| Fixed | Input | Output | Ratio |
|---|---|---|---|
| Outer rotor ($p_1$) | Inner rotor ($p_2$) | Pole piece ($n_s = p_1 + p_2$) | $\frac{p_1}{p_2} + 1$ |
| Pole piece ($n_s = p_1 + p_2$) | Inner rotor ($p_2$) | Outer rotor ($p_1$) | $\frac{p_1}{p_2}$ |
| Inner rotor ($p_2$) | Outer rotor ($p_1$) | Pole piece ($n_s = p_1 + p_2$) | $\frac{p_2}{p_1} + 1$ |

TRANSMISSION FOR VEHICLE

CROSS-REFERENCE TO RELATED APPLICATION

This application claims priority from Korean Patent Application No. 10-2021-0086246 filed on Jul. 1, 2021, which application is incorporated herein by reference in its entirety.

BACKGROUND

1. Technical Field

The present disclosure relates to a transmission for a vehicle, and more particularly, to a vehicle transmission with a transmission shift unit, positions of which are adjusted based on a preset condition.

2. Description of the Related Art

A transmission may vary gear ratios to maintain rotational speed of the engine of a vehicle over different vehicle speeds, enabling the driver to change the gear ratio of the transmission via manipulation of a shift lever.

In a manual shift mode, the driver changes the shift stage, and in an automatic shift mode, the shift stage is automatically changed depending on the vehicle speed when the driver selects the drive stage (D). Further, in a sports mode type transmission, both manual shifting and automatic shifting can be performed in a single transmission system. The sports mode type transmission system may be provided with a manual transmission next to an automatic transmission, allowing the driver to perform manual shifting by increasing or decreasing the gear stage while the system performs automatic shifting by default.

The shift lever is exposed inside the vehicle for the driver's manipulation, and most shift levers are exposed between the center fascia and the console box in the vehicle.

A driver normally selects a shift stage by moving the shift lever, which requires a space amounting to the movement trajectory of the shift lever, which in turn requires design endeavors to prevent the shift lever from interfering with the surroundings thereof.

Recently, a dial-type or button-type shift operation is available to reduce the space required for the shifting manipulation, thereby allowing more efficient use of the interior space of the vehicle and improving maneuverability of the transmissions.

SUMMARY

Aspects of the present disclosure provide a transmission for a vehicle with a transmission shift unit, positions of which are adjusted based on a preset condition.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

In order to achieve the above object, a transmission for a vehicle according to an embodiment of the present invention may include a transmission shift unit configured to receive a shift command of the vehicle, a driving unit configured to generate a driving force for causing the transmission shift unit to be switched between positions, and a controller configured to control the driving unit for causing the transmission shift unit to be switched between the positions depending on whether a preset condition is satisfied. Further, the driving unit may include a first stator configured to generate magnetic flux, a first rotor including first inner permanent magnets and second inner permanent magnets that are disposed circumferentially at regular intervals along a rotational axis, and configured to be rotated by the magnetic flux transmitted to the first inner permanent magnets, outer permanent magnets that are provided in a different number than the second inner permanent magnets, a second rotor disposed between the second inner permanent magnets and the outer permanent magnets, and a clutch unit disposed between the first rotor and the second rotor.

Further, the clutch unit may include a base ring, one or more rollers disposed between the base ring and the second rotor, and one or more elastic parts provided on the base ring and configured to provide an elastic force to the rollers with respect to the base ring. The base ring may include seating surfaces configured to seat the rollers and to provide travel paths of the rollers, each of the elastic parts may be planar and elongated, and each of the seating surfaces may be inclined corresponding to a longitudinal direction of each elastic part and a travel path of each roller. The base ring may include seating surfaces configured to seat the one or more rollers and to provide the rollers with travel paths, respectively, and each of the one or more rollers may be pushed by the second rotor when rotating, toward a spot where the seating surface and an inner surface of the second rotor are spaced by decreasing distances.

The first rotor may include a rotating body and catch portions that protrude from the rotating body, and the first rotor may be rotated by a rotational force of the second rotor transmitted to the catch portions through the rollers. The first rotor may include a rotating body and catch portions that protrude from the rotating body, and each of the one or more rollers may be pushed by the catch portions when the first rotor rotates, toward a spot where the seating surface and the inner surface of the second rotor are spaced by increasing distances. The catch portions may be disposed circumferentially, and each of the catch portions may be disposed between adjacent ones of the rollers.

Further, the first rotor may be coupled to a rotor shaft formed elongated along a rotation axis, the rotor shaft being provided with a magnet holder that is configured to hold a magnetic substance. A magnetic sensor may be further provided to detect a rotation angle of the first rotor by using a magnetic force distribution of the magnetic substance.

Further, the controller may be configured to control the driving unit to cause the shift unit to be switched to a parking stage position when a parking condition is satisfied, and to control the driving unit to cause the shift unit to be switched to a stowed position when a stowing condition is satisfied. For example, the stowing condition may include at least one of turning off the vehicle or a user command input.

The controller may be configured to control, in response to the shift unit being switched from a first shift stage position to a second shift stage position when a shift condition is not satisfied, the driving unit to cause the shift unit to be switched to the first shift stage position. In addition, the controller may be configured to output a warning alarm in response to the shift unit being switched from the first shift stage position to the second shift stage position when the shift condition is not satisfied. The controller may be configured to determine whether the shift condition is satisfied by referring to at least one of an operation angle of a brake pedal or a driving speed of the vehicle.

Further, the second rotor may be configured to be intermittently rotated in response to being subjected to a force greater than a magnetic force between the second inner permanent magnets and the outer permanent magnets.

BRIEF DESCRIPTION OF THE DRAWINGS

The above and other aspects and features of the present disclosure will become more apparent by describing in detail exemplary embodiments thereof with reference to the attached drawings, in which:

FIG. 17 is a reduction ratio table according to an embodiment of the present disclosure;

DETAILED DESCRIPTION

Hereinafter, embodiments of the present disclosure will be described with reference to the attached drawings.

Figure 1:
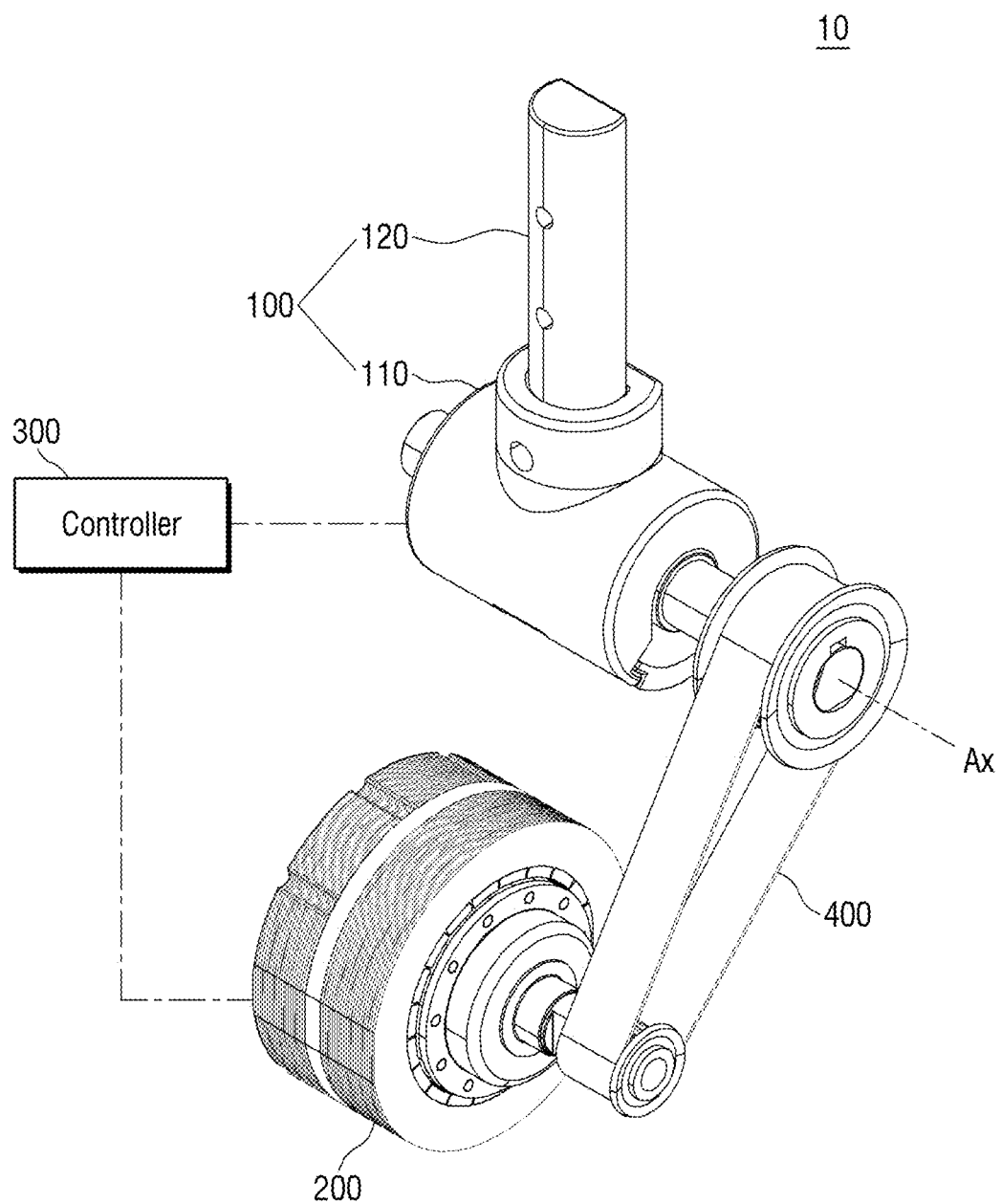
FIG. 1 shows a transmission for a vehicle, according to an embodiment of the present disclosure.
Figure 2:
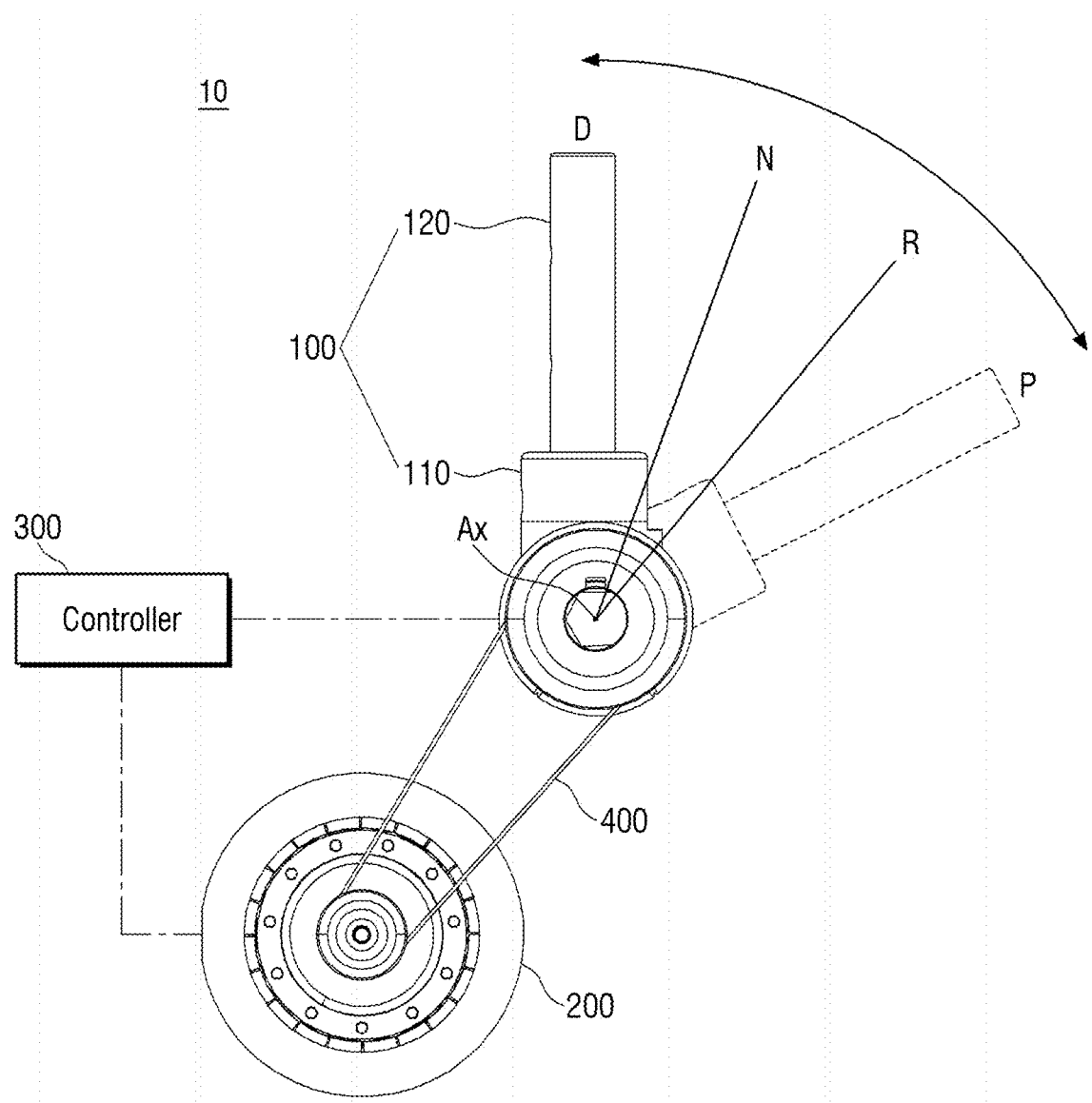
FIG. 2 is a diagram illustrating a transmission shift unit in which the shift stage is adjusted by a driving unit according to an embodiment of the present disclosure.
Figure 3:
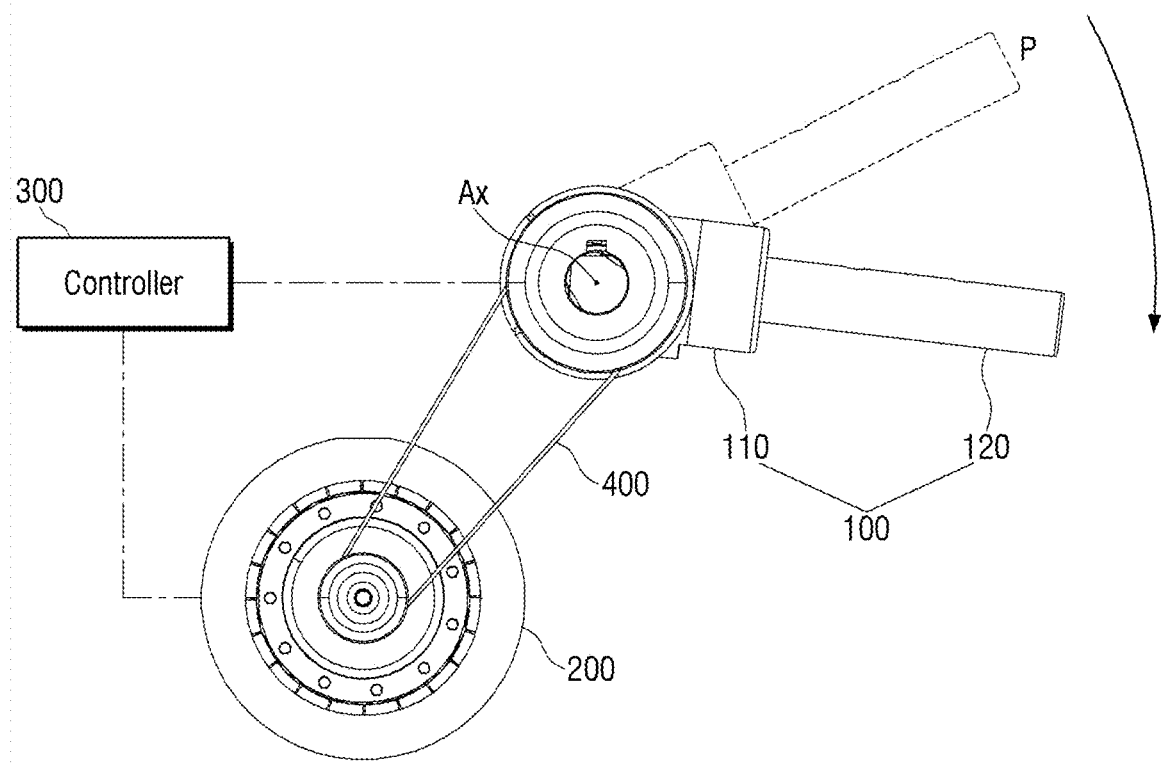
FIG. 3 is a diagram illustrating the transmission shift unit being switched to a stowed position by the driving unit according to an embodiment of the present disclosure.

FIG. 1 is a diagram of a transmission 10 for a vehicle, according to an embodiment of the present disclosure. FIG. 2 is a diagram illustrating a transmission shift unit, also referred to as a shift unit 100, the shift stage of which may be adjusted by a driving unit 200. FIG. 3 is a diagram illustrating the shift unit 100 being switched to a stowed position by the driving unit 200. Referring to FIG. 1, the vehicle transmission 10 according to an embodiment of the present disclosure may include a shift unit 100, a driving unit 200, and a controller 300.

The shift unit 100 may receive a shift command of the vehicle. Further, the shift unit 100 may include a shift body 110 and a shift lever 120. The shift body 110 may rotate about a rotation axis Ax. The shift lever 120 may be elongated in one direction from the shift body 110. For example, the shift lever 120 may be elongated in a direction perpendicular to the rotation axis Ax. As the shift body 110 rotates, the longitudinal direction of the shift lever 120 may be changed or switched. A user (e.g., a driver) may operate the shift unit 100 to change the shift stage of the vehicle. In some embodiments of the present disclosure, the shift stages selectable by the shift unit 100 may include a parking stage (P stage), a reverse stage (R stage), a neutral stage (N stage), and a drive stage (D stage).

The driving unit 200 may generate a driving force for repositioning or switching the transmission shift unit or, simply, shift unit 100 between the shift positions. For example, the driving unit 200 may generate a rotational force, by which the shift unit 100 may be turned and switched between the shift positions.

Referring to FIG. 2, as the driving force of the driving unit 200 may be transmitted to the shift unit 100, and the shift unit 100 may be switched to one of its shift positions among a parking stage (P stage), a reverse stage (R stage), a neutral stage (N stage), and a drive stage (D stage). Further, the transmission 10 for a vehicle according to some embodiments of the present disclosure may have a stowed position. Referring to FIG. 3, the shift unit 100 may be switched from the parking stage position to the stowed position. The stowed position may refer a position in which the shift lever 120 of the shift unit 100 is disposed in parallel or near parallel to the ground (or substantially horizontal with respect to the orientation shown in FIG. 3). In the stowed position, the shift stage of the shift unit 100 may maintain the parking stage. A separate stowing device (not shown) may be provided for stowing the shift lever 120 of the shift unit 100. In such a case, the stowed position may mean that the shift lever 120 is stowed in the stowing device, and an unstowed position may mean that the shift lever 120 is exposed out of the stowing device.

The driving force of the driving unit 200 may be transmitted to the shift unit 100 by a drive transmission medium 400. FIGS. 1 to 3 illustrate the driving force transmitting medium 400 provided in the form of a belt, which is exemplary, and the driving force transmitting medium 400 may be provided in various other forms such as a wire or a gear. Alternatively, the driving unit 200 may have its spindle directly connected to a spindle of the shift unit 100 for transmitting the driving force of the driving unit 200 to the shift unit 100 without relaying the same by the drive transmission medium 400.

The controller 300 may be configured to control the driving unit 200 to cause the shift unit 100 to be switched between positions based on whether a preset condition is satisfied. Specifically, when the parking condition is satisfied, the controller 300 may be configured to control the driving unit 200 for switching the shift unit 100 to the parking stage position. For example, when the vehicle is turned off or turned on, the controller 300 may be configured to control the driving unit 200 to switch the shift unit 100 to the parking position. Alternatively, when the stowing condition is satisfied, the controller 300 may be configured to control the driving unit 200 to switch the shift unit 100 to the stowed position. For example, when the vehicle is turned off or a separate user command is inputted by using a button or other input means, the controller 300 may be configured to control the driving unit 200 to cause the shift unit 100 to be switched to the stowed position. Alternatively, if the shift unit 100 is switched from a first shift stage position to a second shift stage position while the shift condition is not satisfied, the controller 300 may be configured to control the driving unit 200 causing the shift unit 100 to be switched back to the first shift stage position. For example, the shift unit 100, which is in the drive stage position, may be switched to the neutral stage position by a mistake of a user. In this case, the controller 300 may be configured to determine whether the reposition to the neutral stage is intentional or by mistake of the user, and upon determining that the reposition to the neutral stage is due to a mistake, it may be configured to control the driving unit 200 for switching the shift unit 100 back to the drive stage position.

Figure 4:
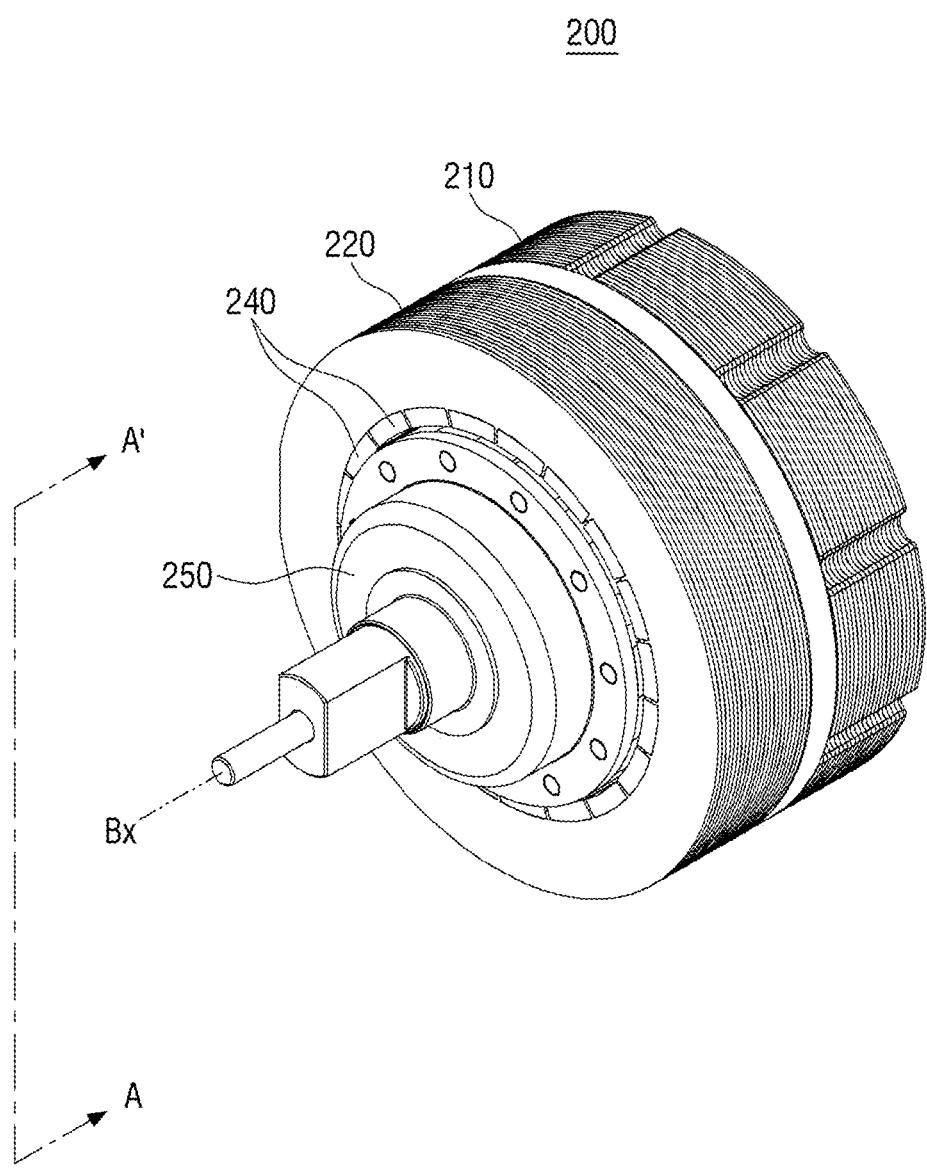
FIG. 4 is a front perspective view of a driving unit according to an embodiment of the present disclosure.
Figure 5:
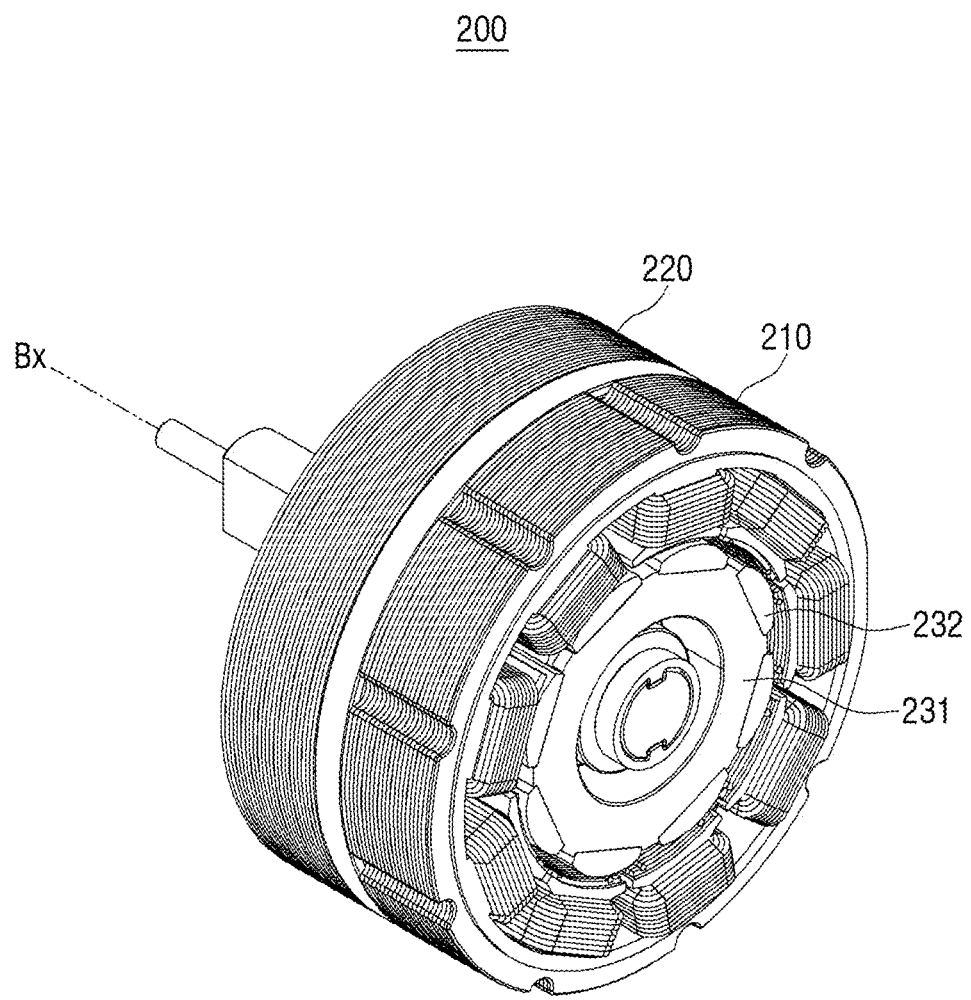
FIG. 5 is a rear perspective view of the driving unit according to an embodiment of the present disclosure.
Figure 6:
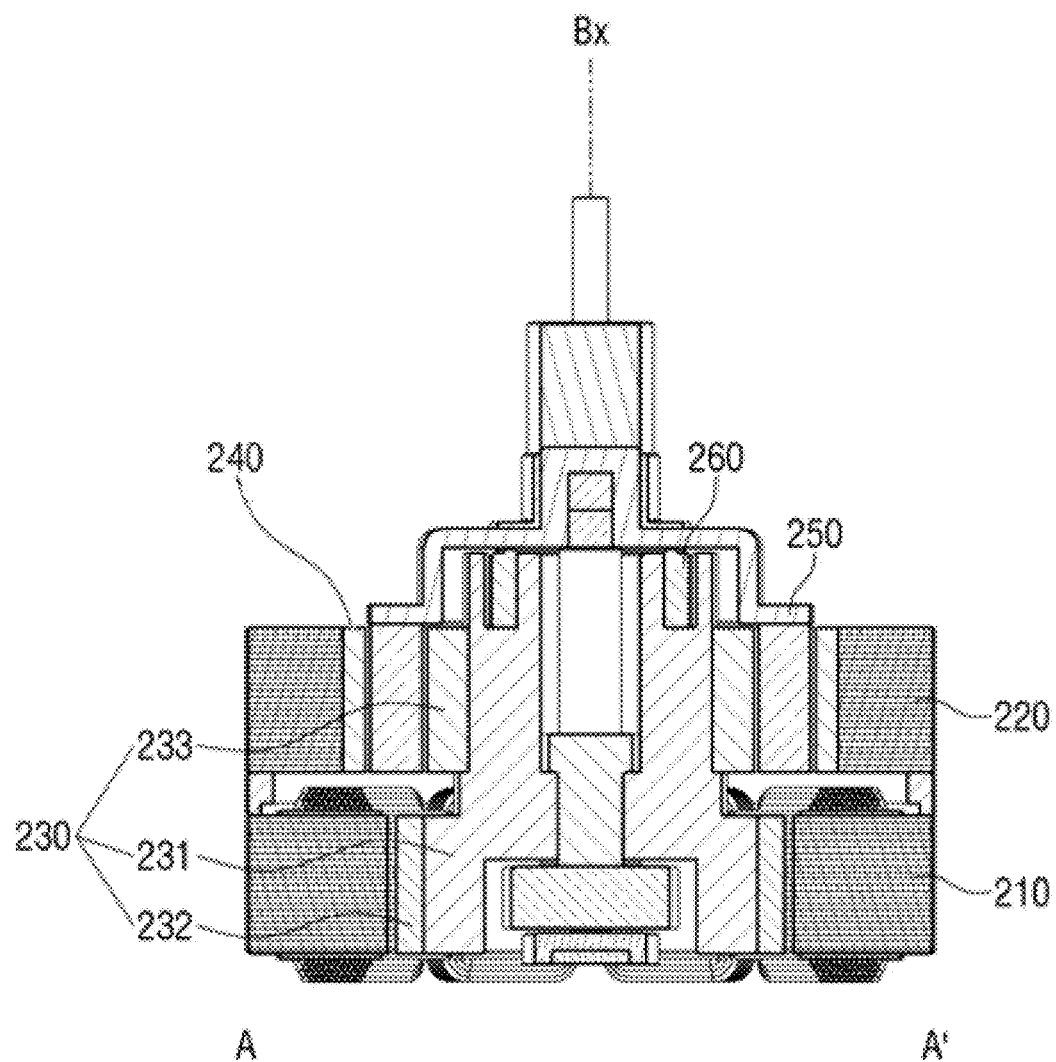
FIG. 6 is a cross-sectional view taken along line A-A' in FIG. 4 according to an embodiment of the present disclosure.

FIG. 4 is a front perspective view of a driving unit 200, FIG. 5 is a rear perspective view of the driving unit 200, and FIG. 6 is a cross-sectional view taken along line A-A' in FIG. 4. Referring to FIGS. 4 to 6, the driving unit 200 may include a first stator 210, a second stator 220, a first rotor 230, outer permanent magnets 240, a second rotor 250, and a clutch unit 260.

The first stator 210 may generate magnetic flux. The first stator 210 may include a plurality of coils provided separately from one another. Specifically, the first stator 210 may include a plurality of coils in a three-phase connection to generate magnetic flux by receiving power with different time offsets. Power may be sequentially supplied to the coils in a three-phase connection, and the energized coils may generate magnetic flux. A detailed description of the first stator 210 will be presented below with reference to FIGS. 7 and 8.

The second stator 220 may support the outer permanent magnets 240. The first stator 210 and the second stator 220 may be arranged adjacent along the rotation axis Bx. In the present disclosure, the rotation axis Bx may correspond to the rotation shaft for both the first rotor 230 and the second rotor 250.

The first rotor 230 may include a rotating body 231, first inner permanent magnets 232, and second inner permanent magnets 233. The first rotor 230 may be rotated by the magnetic flux transmitted from the first stator 210. A detailed description of the first rotor 230 will be presented below with reference to FIGS. 10 to 12.

A plurality of outer permanent magnets 240 may be disposed in the form of a ring externally of the first rotor 230. Specifically, the outer permanent magnets 240 may be disposed concentrically with the second inner permanent magnets 233 about the rotation axis Bx where the second inner permanent magnets 233 are disposed. The number of the outer permanent magnets 240 may be different from the number of the second inner permanent magnets 233. Specifically, the number of the outer permanent magnets 240 may be greater than the number of the second inner permanent magnets 233.

The second rotor 250 may be disposed between the second inner permanent magnets 233 and the outer permanent magnets 240, and it may rotate along a magnetic force path between the second inner permanent magnets 233 and the outer permanent magnets 240. In particular, the second rotor 250 may rotate at revolutions per unit time (e.g., revolutions per minute, RPM) different from the number of revolutions per unit time of the first rotor 230. The second rotor 250 may include a plurality of pole pieces 252 (see FIG. 13). The second rotor 250 may rotate with the magnetic force path formed by the pole pieces 252 between the second inner permanent magnets 233 and the outer permanent magnets 240. Accordingly, the number of revolutions per unit time of the second rotor 250 with respect to the number of revolutions per unit time of the first rotor 230 may be determined by the number of first inner permanent magnets 232, the number of second inner permanent magnets 233, and the number of pole pieces 252. The number of the outer permanent magnets 240 may be greater than the number of the second inner permanent magnets 233 first rotor 230 as mentioned above, wherein the number of revolutions per unit time of the second rotor 250 may be smaller than the number of revolutions per unit time of the first rotor 230.

The clutch unit 260 may be disposed between the first rotor 230 and the second rotor 250. As the clutch unit 260 receives a driving force from the first rotor 230 or the second rotor 250, it may selectively transmit the rotational force of the first rotor 230 or the second rotor 250. The operation of the clutch unit 260 may dictate the frictional force between the clutch unit 260 and the second rotor 250. Upon receiving the driving force from the first rotor 230, the clutch unit 260 may be spaced apart (e.g., disengaged) from the second rotor 250 or may be in contact with the second rotor 250 with a relatively low frictional force. In this case, the second rotor 250 may rotate nearly unaffected by the clutch unit 260. On the other hand, upon receiving the driving force from the second rotor 250, the clutch unit 260 may be in close contact (e.g., engaged) with the second rotor 250 with a relatively high frictional force. In this case, the driving force of the second rotor 250 may be transmitted via the clutch unit 260 to the first rotor 230.

A detailed description concerning the linkage and power transmission of the first rotor 230, the second rotor 250, and the clutch unit 260 will be described below with reference to FIGS. 20 to 25.

Figure 7:
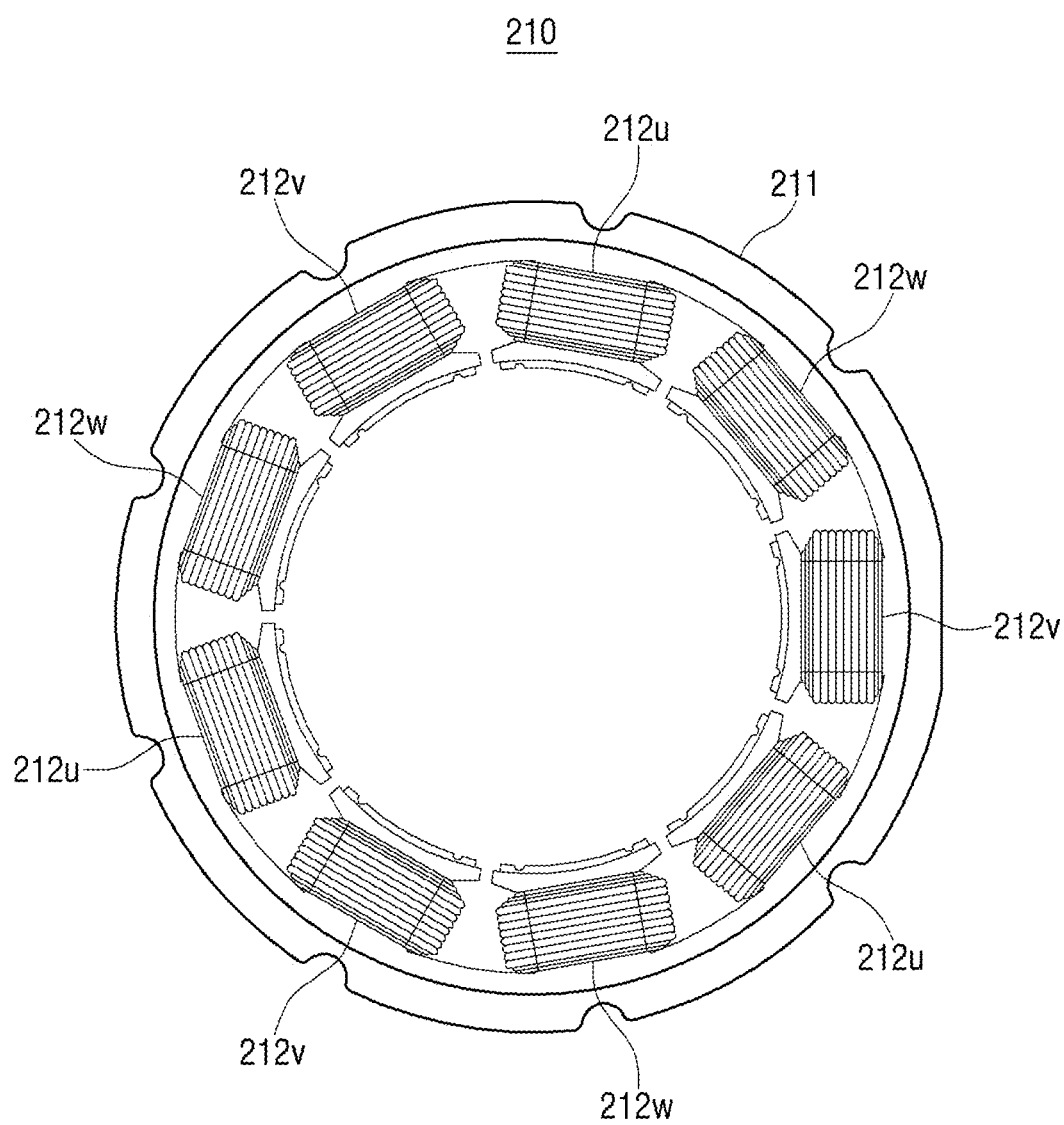
FIG. 7 is a view of a first stator according to an embodiment of the present disclosure.
Figure 8:
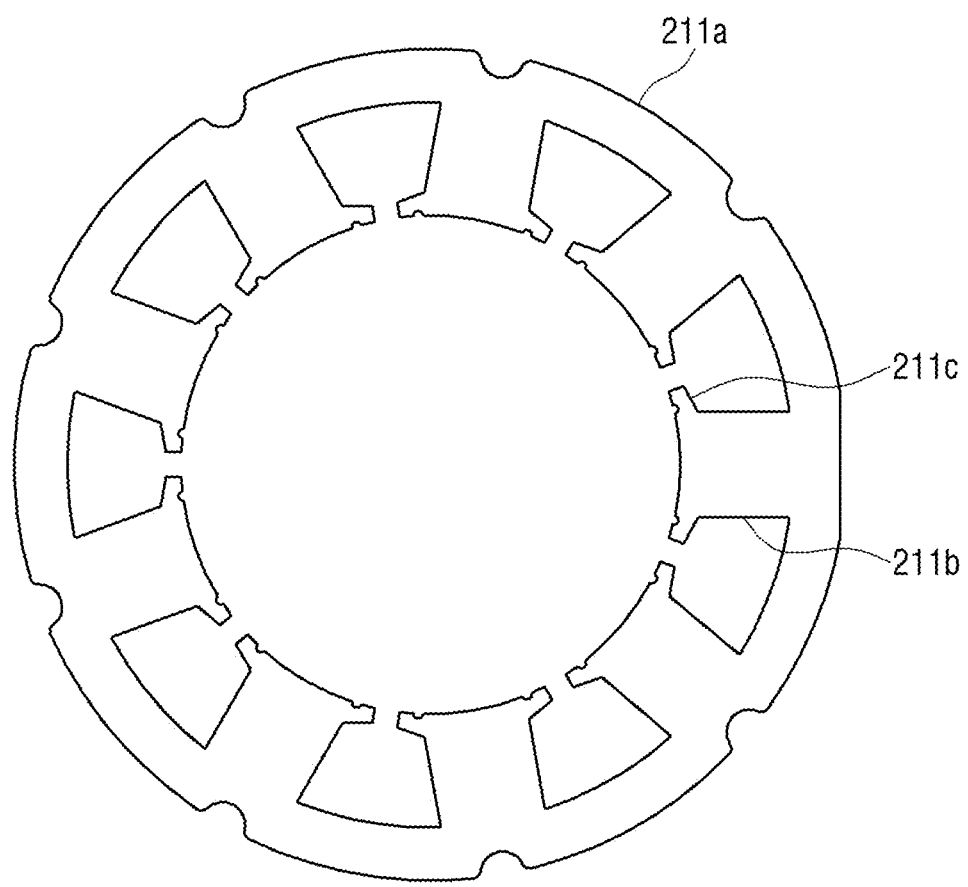
FIG. 8 is a view of the stationary body of the first stator according to an embodiment of the present disclosure.

FIG. 7 is a view of a first stator 210, and FIG. 8 is a view of a stationary body 211 of the first stator 210. Referring to FIGS. 7 and 8, the first stator 210 may include the stationary body 211 and coils 212u, 212v, and 212w.

The stationary body 211 may include a rim 211a, legs 211b, and teeth 211c. The rim 211a may be provided in the form of a ring. A plurality of legs 211b may radially protrude internally from the rim 211a. The coils 212u, 212v, 212w may be wound around the legs 211b. To this end, the legs 211b that protrude from the rim 211a may have a predetermined length or more.

The teeth 211c may be provided at the distal end of each of the plurality of legs 211b. The teeth 211c may prevent separation of the coils 212u, 212v, 212w wound around the legs 211b. Additionally, the teeth 211c may form a magnetic flux path of magnetic flux generated in the coils 212u, 212v, and 212w.

By way of example, nine (9) legs 211b may be provided. The nine legs 211b may be disposed on the rim 211a so that the intervals between the adjacent legs 211b are consistent. FIG. 7 illustrates that U-phase coils 212u, V-phase coils 212v, and W-phase coils 212w are installed in the stationary body 211. The U-phase coils 212u, V-phase coils 212v, and W-phase coils 212w may be sequentially wound around the legs 211b in a clockwise or counterclockwise direction. The coils 212u, 212v, 212w of the same phase may be interconnected electrically. FIG. 7 shows the provision of three U-phase coils 212u that are interconnected electrically, three V-phase coils 212v that are interconnected electrically, and three W-phase coils 212w that are interconnected electrically. Therefore, when electric power is supplied to one of the three U-phase coils 212u, it may be also supplied to the other two U-phase coils 212u, which similarly applies to the V-phase coils 212v and the W-phase coils 212w.

Among the plurality of coils in a three-phase connection, a first-phase coil may be understood as corresponding to the U-phase coil 212u, a second-phase coil corresponding to the V-phase coil 212v, and a third-phase coil corresponding to the W-phase coil 212w.

The above description illustrates the legs 211b as being nine, although some embodiments of the present disclosure may provide less or more than nine legs 211b. The following description is principally based on nine legs 211b for illustration purposes.

Figure 9:
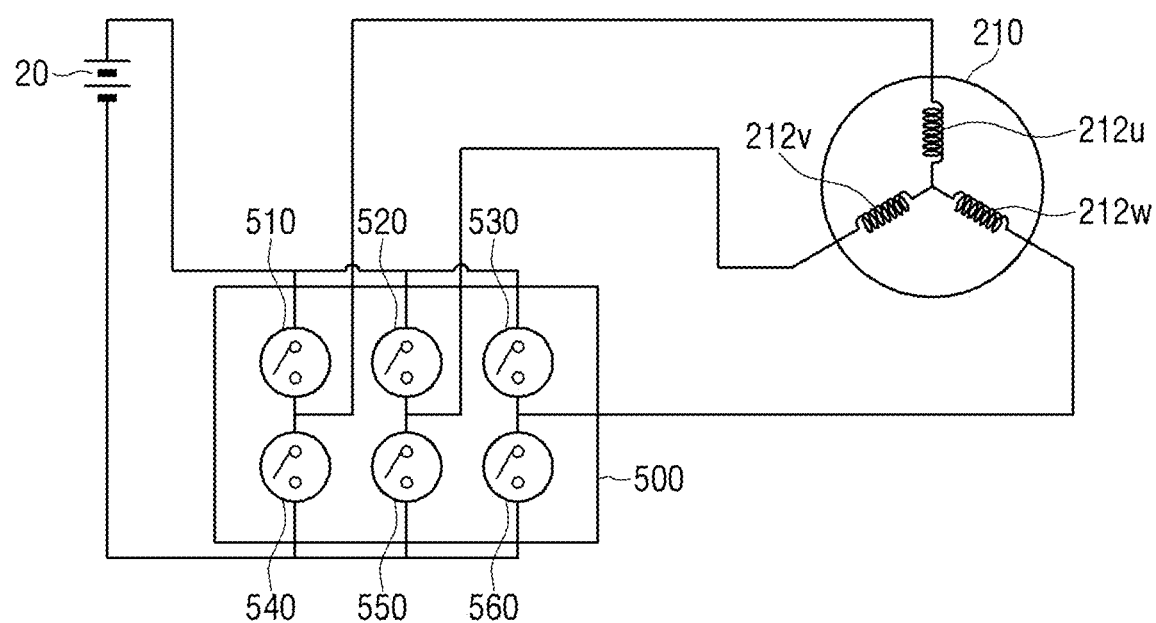
FIG. 9 is a diagram for explaining the operation principle of the first stator according to an embodiment of the present disclosure.

FIG. 9 is a diagram for explaining the operation principle of the first stator 210. Referring to FIG. 9, the first stator 210 may be connected to a vehicle power source 20 through a switching unit 500. The vehicle power source 20 may be a battery provided in the vehicle, but the vehicle power source 20 of the present disclosure is not limited to the battery.

The switching unit 500 may include a plurality of switches 510 to 560. The plurality of switches 510 to 560 may include six switches. The plurality of switches 510 to 560 may include first to third switch groups connected in parallel. The first switch group may include the first switch 510 and the fourth switch 540 connected in series, the second switch group may include the second switch 520 and the fifth switch 550 connected in series, and the third switch group may include the third switch 530 and the sixth switch 560 connected in series.

A junction between the first switch 510 and the fourth switch 540 may be connected to, among the plurality of coils in a three-phase connection, a first-phase coil, i.e., the U-phase coils 212u, a junction between the second switch 520 and the fifth switch 550 may be connected to a second-phase coil, i.e., the V-phase coils 212v, and a junction between the third switch 530 and the sixth switch 560 may be connected to a third-phase coil, i.e., the W-phase coils 212w.

The operation of each of the six switches 510 to 560 may be controlled by the controller 300. The controller 300 may be configured to individually control the opening and closing of the six switches 510 to 560. With individual operations of the switches 510 to 560, the transmission may determine the allowing or breaking of the power supply from the vehicle power source 20 to each of the coils 212u, 212v, and 212w provided in the first stator 210. For example, the operations of the switches 510 to 560 may cause the electric power to be supplied to a selected coil among the U-phase coils 212u, the V-phase coils 212v, and the W-phase coils 212w.

The sequential supply of power may be performed in units of a pair of coils. For example, the operations of the switches 510 to 560 may sequentially establish a power supply circuit including a pair of coils, and power may be supplied to the pair of coils existing on that circuit. The coils in the pair may generate magnetic fluxes of different polarities, respectively. For example, one of the coils in the pair may generate an N-pole magnetic flux, and the other may generate an S-pole magnetic flux. One of the coils in the pair may apply a pushing force (e.g., a repulsive force) to the first rotor 230, and the other may apply a pulling force (e.g., an attractive force) to the first rotor 230.

The coil pairs may change sequentially. For example, after power is supplied to the U-phase coil 212u and the V-phase coil 212v, power may be supplied to the V-phase coil 212v and the W-phase coil 212w, followed by power being supplied to the W-phase coil 212w and the U-phase coil 212u, which proceeds repeatedly. The torque generated by changing coil pairs may rotate first rotor 230.

Figure 10:
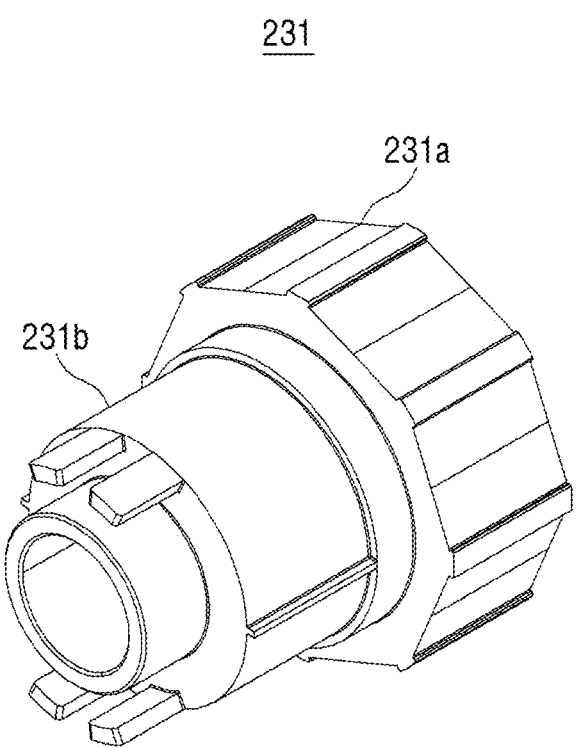
FIG. 10 is a view of the rotating body of the first rotor according to an embodiment of the present disclosure.
Figure 11:
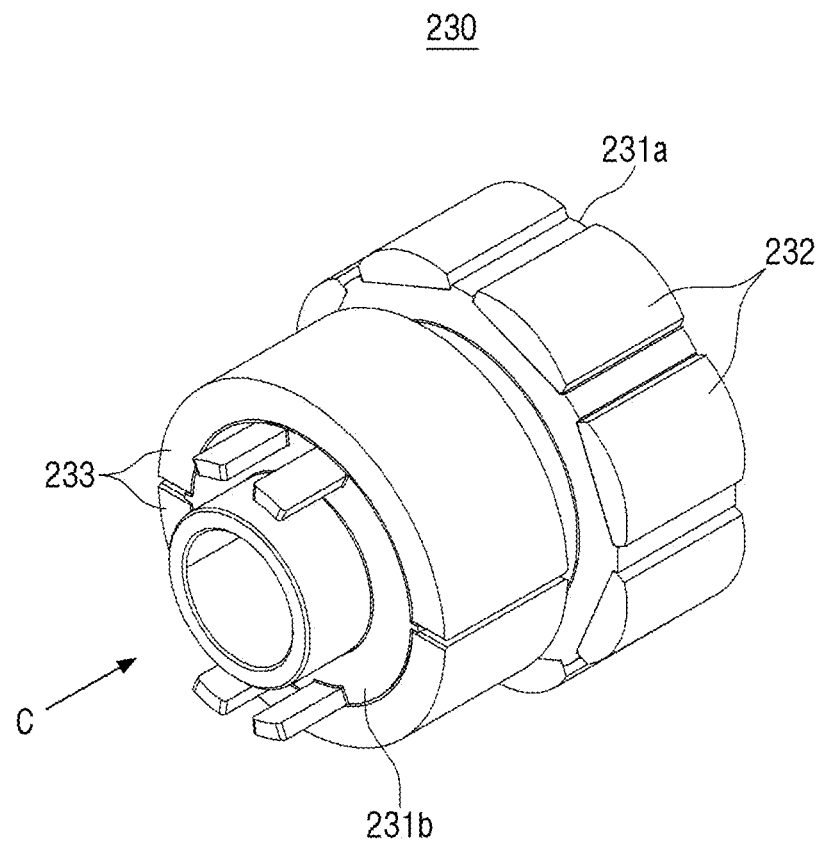
FIG. 11 is a view showing the rotating body of the first rotor installed with first inner permanent magnets and second inner permanent magnets according to an embodiment of the present disclosure.
Figure 12:
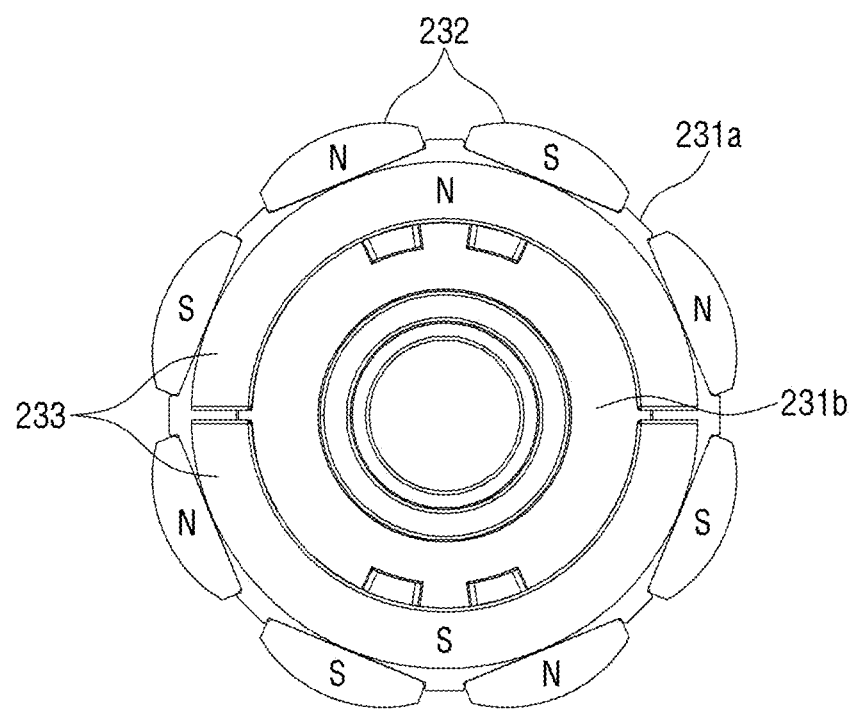
FIG. 12 is a view looking in the direction of C in FIG. 11.

FIG. 10 is a view of the rotating body 231 of the first rotor 230, FIG. 11 is a view showing the rotating body 231 of the first rotor 230 installed with the first inner permanent magnets 232 and the second inner permanent magnets 233, and FIG. 12 is a view looking in the direction of C in FIG. 11. Referring to FIGS. 10 to 12, the first rotor 230 may include the rotating body 231, first inner permanent magnets 232, and second inner permanent magnets 233.

The rotating body 231 may be provided substantially in the form of a cylinder. The rotating body 231 may include a first rotating body portion 231a and a second rotating body portion 231b. The first rotation body portion 231a and the second rotation body portion 231b may be disposed at different axial positions along the rotation axis Bx. As will be described below, the first rotating body portion 231a may be coupled with the first inner permanent magnets 232, and the second rotating body portion 231b may be coupled with the second inner permanent magnets 233. As the first rotation body portion 231a and the second rotation body portion 231b are disposed at different axial positions along the rotation axis Bx, the first inner permanent magnets 232 and the second inner permanent magnets 233 may be disposed on the rotation body 231 at regular intervals along the rotation axis Bx.

The second rotating body portion 231b may be formed to have a diameter smaller than a diameter of the first rotating body portion 231a. However, according to some embodiments of the present disclosure, the diameter of the first rotating body portion 231a may be smaller than or equal to the diameter of the second rotating body portion 231b.

Referring to FIG. 12, a plurality of first inner permanent magnets 232 may be provided and coupled to the outer surface of the first rotating body portion 231a in the form of a ring. The plurality of first inner permanent magnets 232 may be disposed with different (e.g., alternating) polarities thereof being adjacent to each other on the outer surface of the first rotating body portion 231a. In other words, the permanent magnet of the S pole may be disposed adjacent to the permanent magnet of the N pole. FIG. 12 illustrates that the first rotor 230 is configured by including eight (8) first inner permanent magnets 232, but this is merely illustrative and according to some embodiments of the present disclosure, different numbers may be selected for the first inner permanent magnets 232. However, the number of the first inner permanent magnets 232 may be different from the number of the coils 212u, 212v, 212w installed in the first stator 210.

A plurality of second inner permanent magnets 233 may be provided and coupled in the form of a ring to the outer surface of the second rotating body portion 231b. The plurality of second inner permanent magnets 233 may be disposed with different polarities thereof being adjacent to each other on the outer surface of the second rotating body portion 231b. In other words, the permanent magnet of the S pole may be disposed adjacent to the permanent magnet of the N pole. FIG. 12 illustrates that the first rotor 230 is configured to include two (2) second inner permanent magnets 233, but this is merely illustrative and according to some embodiments of the present disclosure, different numbers may be selected for the second inner permanent magnets 233. However, the number of the second inner permanent magnets 233 may be different from the number of the outer permanent magnets 240 installed in the second stator 220.

The first rotor 230 may be rotated by the magnetic flux transferred to the first inner permanent magnets 232 thereof from the first stator 210. The magnetic flux of the first stator 210 may generate a force for moving the first inner permanent magnets 232, by which the first rotor 230 rotates.

Figure 13:
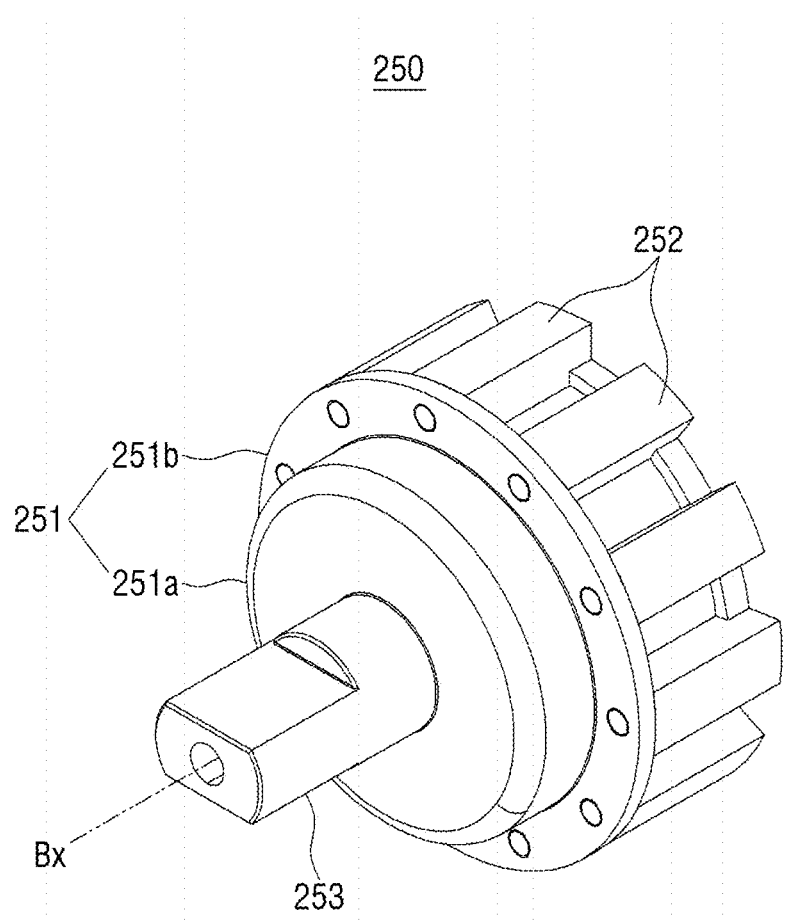
FIG. 13 is a view of the second rotor according to an embodiment of the present disclosure.

FIG. 13 is a view of the second rotor 250. Referring to FIG. 13, the second rotor 250 may include a base 251, pole pieces 252, and a spindle 253. The base 251 may be formed with a plane perpendicular to the rotation axis Bx of the second rotor 250. The base 251 may include a central portion 251a and an edge portion 251b. The central portion 251a may protrude from the edge portion 251b in a direction parallel to the rotation axis Bx. The central portion 251a may be formed with a recessed space that faces the first rotor 230. The recessed space of the second rotor 250 may accommodate the clutch unit 260 therein.

The pole pieces 252 may be joined with the edge portion 251b. A plurality of pole pieces 252 may be provided and formed to extend in one direction from the edge portion 251b. The plurality of pole pieces 252 may have an elongated shape parallel to the rotation axis Bx of the second rotor 250. The plurality of pole pieces 252 may be arranged in a ring shape about the rotation axis Bx of the second rotor 250. In this case, the respective adjacent pole piece 252 among the plurality of pole pieces 252 may be disposed to be spaced apart from each other by a predetermined distance. The separation distance between adjacent pole pieces 252 may be equally applied to all adjacent pole pieces 252.

The base 251 may be provided with a spindle 253. Accordingly, when the second rotor 250 rotates, the spindle 253 provided on the base 251 may rotate along with the second rotor 250. The spindle 253 may output the rotational force of the second rotor 250. As the second rotor 250 rotates, an object coupled to the spindle 253 may rotate in unison with the second rotor 250.

Figure 14:
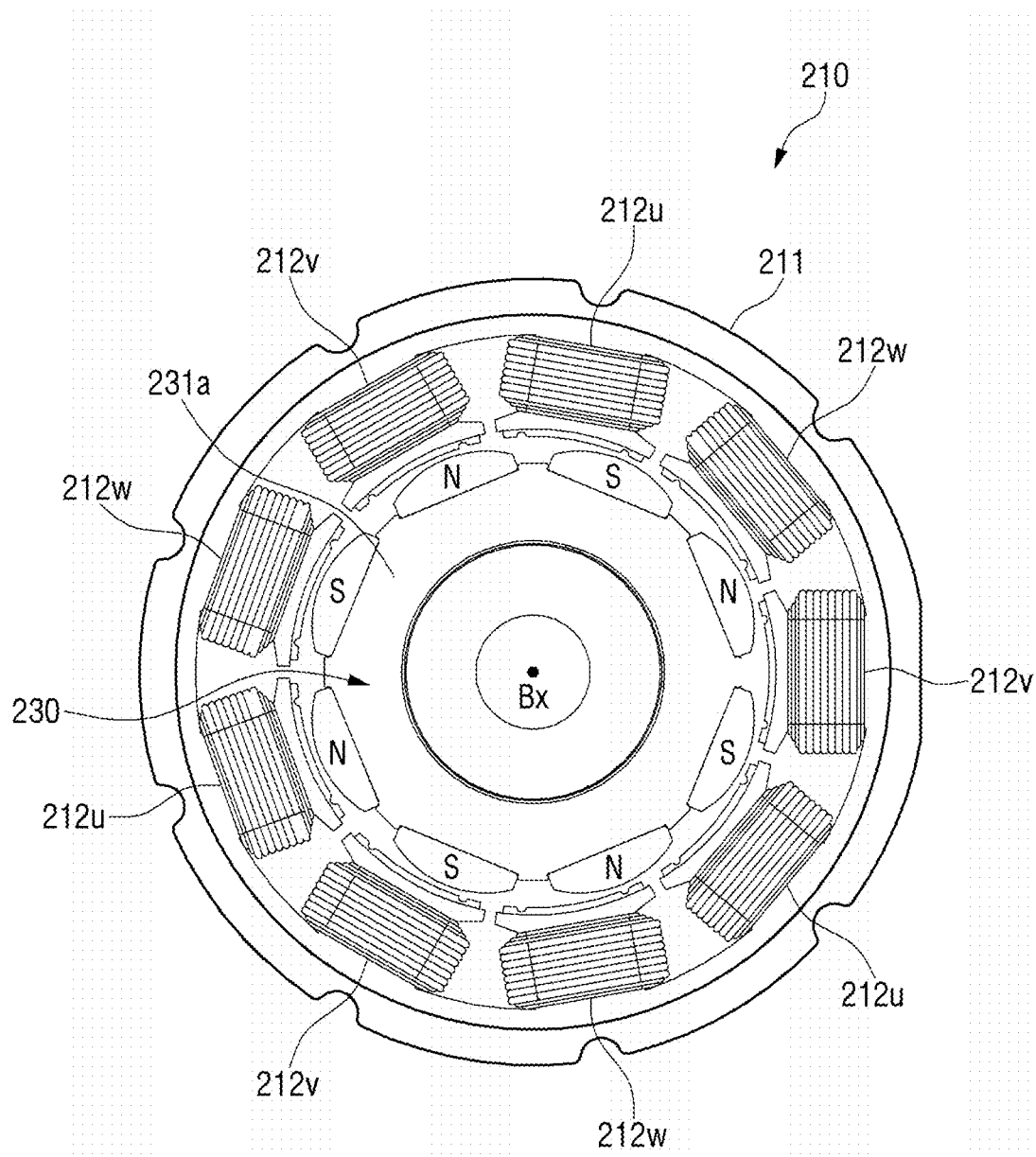
FIG. 14 is a view for explaining the rotation operation of the first rotor with respect to the first stator according to an embodiment of the present disclosure.

FIG. 14 is a view for explaining a rotation operation of the first rotor 230 with respect to the first stator 210. Referring to FIG. 14, the first stator 210 and the first rotor 230 may be disposed about the common rotation axis Bx. Accordingly, the central axis of the rim 211a of the first stator 210 may coincide with the central axis of the first rotor 230.

The plurality of coils 212u, 212v, and 212w provided in the first stator 210 may generate magnetic flux for each phase. For example, after the U-phase coil 212u generates its magnetic flux, the V-phase coil 212v may generate its magnetic flux, and then the W-phase coil 212w may generate its magnetic flux. When the coil of one phase generates its magnetic flux, other coils may be stopped from generating their magnetic fluxes. The magnetic fluxes generated in the respective phase coils may be transmitted to the first inner permanent magnets 232 of the first rotor 230 and thereby may apply a force to the first inner permanent magnets 232. Alternatively, the coils of the two phases may generate magnetic fluxes concurrently. For example, the U-phase coil 212u and the V-phase coil 212v may simultaneously generate magnetic fluxes, or the V-phase coil 212v and the W-phase coil 212w may simultaneously generate magnetic fluxes, or the W-phase coil 212w and the U-phase coil 212u may simultaneously generate magnetic fluxes. Here, one of the two coils that simultaneously generate magnetic fluxes may apply a pulling force to the pulling first rotor 230, and the other may apply a pushing force thereto.

The first rotor 230 may rotate about the rotation axis Bx by the force applied to the first inner permanent magnets 232 thereof. With the magnetic fluxes generated rotationally by the respective phase coils 212u, 212v, and 212w of the first stator 210, the first rotor 230 may continuously rotate.

Figure 15:
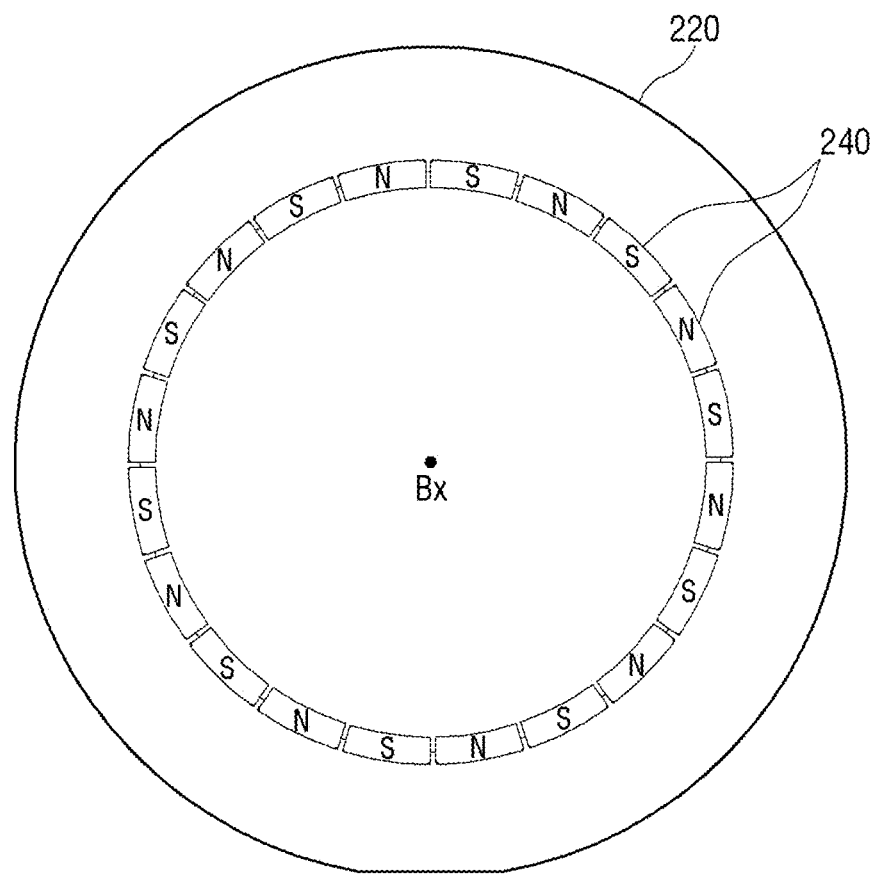
FIG. 15 is a view showing that the outer permanent magnets are coupled to the second stator according to an embodiment of the present disclosure.

FIG. 15 is a view showing that the outer permanent magnets 240 are coupled to the second stator 220. Referring to FIG. 15, the outer permanent magnets 240 may be coupled to the second stator 220 and fixed thereto.

The second stator 220 may be provided in the shape of a ring. For example, the outer diameter of the second stator 220 may be equal or similar to the outer diameter of the first stator 210. The plurality of outer permanent magnets 240 may be arranged in a ring shape along the inner surface of the second stator 220.

The plurality of outer permanent magnets 240 may be arranged with different polarities thereof being adjacent to each other. In other words, the permanent magnet of the S pole may be disposed adjacent to the permanent magnet of the N pole. FIG. 15 shows that twenty (20) outer permanent magnets 240 are coupled to the second stator 220, which is merely exemplary and some embodiments of the present disclosure may provide various numbers of outer permanent magnets 240. However, the number of the outer permanent magnets 240 may be different from the number of the second inner permanent magnets 233 installed in the first rotor 230. Specifically, the number of the outer permanent magnets 240 may be selected to be greater than the number of the second inner permanent magnets 233 installed in the first rotor 230.

Figure 16:
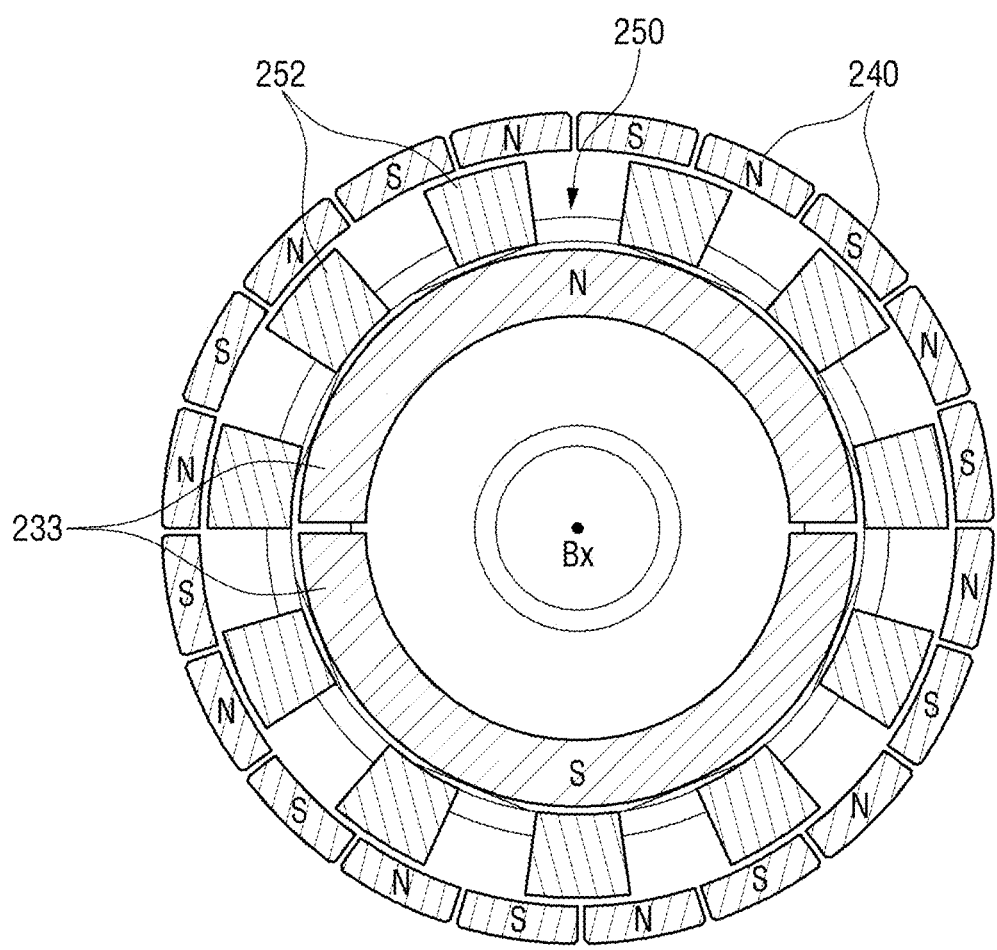
FIG. 16 is a view for explaining the coupling relationship between the first rotor, the second rotor, and the outer permanent magnet according to an embodiment of the present disclosure.
Figure 18:
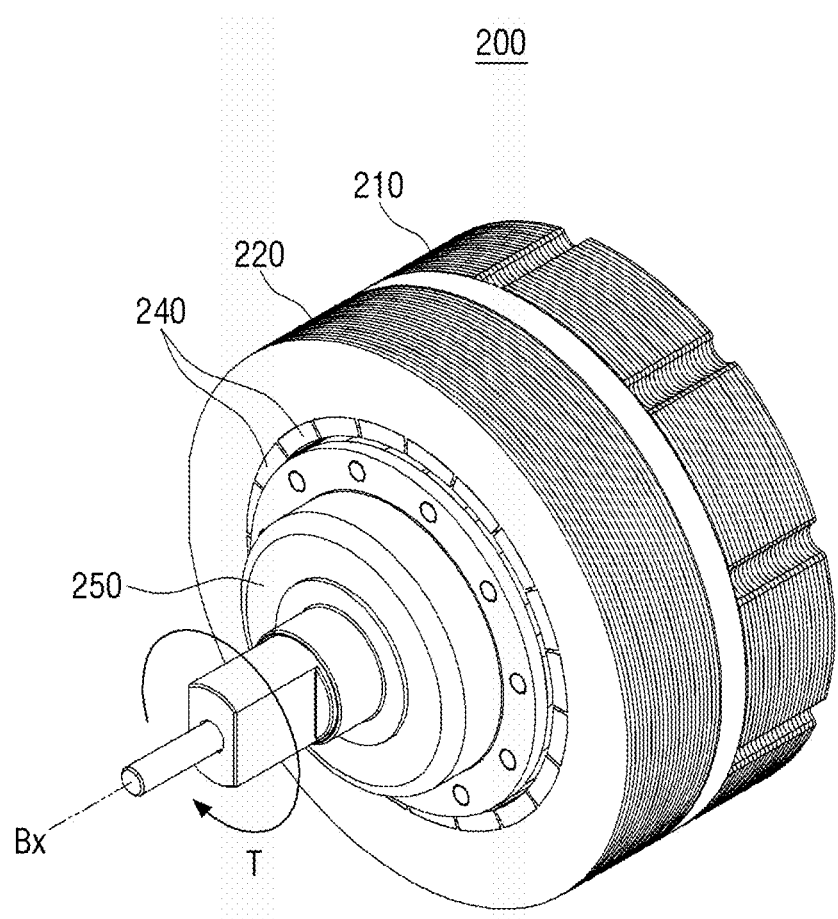
FIG. 18 is a view for explaining the rotation operation of the second rotor according to an embodiment of the present disclosure.

FIG. 16 is a view for explaining the coupling between the first rotor 230, the second rotor 250, and the outer permanent magnets 240, FIG. 17 is a reduction ratio table, and FIG. 18 is a view for explaining a rotation operation of the second rotor 250. Referring to FIG. 16, the plurality of pole pieces 252 may be disposed between the second inner permanent magnets 233 and the outer permanent magnets 240. The plurality of pole pieces 252 may form a magnetic force path between the second inner permanent magnets 233 and the outer permanent magnets 240. In the present disclosure, the pole pieces 252 may be a magnetic substance. For example, the pole pieces 252 of the present disclosure may be a ferromagnetic material or a diamagnetic material. Accordingly, the pole pieces 252 disposed between the second inner permanent magnets 233 and the outer permanent magnets 240 may be simultaneously magnetized by the second inner permanent magnets 233 and the outer permanent magnets 240 to establish a magnetic force path therebetween.

The number of the plurality of pole pieces 252 provided in the second rotor 250 may be different from the numbers of the second inner permanent magnets 233 and the outer permanent magnets 240. For example, the number of the plurality of pole pieces 252 may be different from the number of the second inner permanent magnets 233 and different from the number of the outer permanent magnets 240.

The direction of the force that acts on each pole piece 252 may vary based on the positions of the surrounding ones of the second inner permanent magnets 233 and the outer permanent magnets 240. In particular, a force in the circumferential direction of the second rotor 250 may act on some of the pole pieces 252 among the plurality of pole pieces 252. When the first rotor 230 does not rotate, the resultant force in the circumferential direction that acts on the plurality of pole pieces 252 provided in the second rotor 250 may be zero. In this case, the second rotor 250 may not rotate. On the other hand, when the first rotor 230 rotates, the resultant force in the circumferential direction acting on the plurality of pole pieces 252 provided in the second rotor 250 may have a certain magnitude. The second rotor 250 may be rotated about the rotation axis Bx by the resultant force.

Compared to the number of revolutions per unit time of the first rotor 230, the number of revolutions per unit time of the second rotor 250 may be configured to be small. Meanwhile, the force that acts on the second rotor 250 by the first rotor 230 that rotates for a unit time may be accumulated during that time, and thus the second rotor 250 may rotate with a higher torque than the first rotor 230. The torque of the second rotor 250 may be determined by the number of second inner permanent magnets 233, the number of outer permanent magnets 240, and the number of pole pieces 252.

Reduction ratios based on the number of the second inner permanent magnets 233, the outer permanent magnets 240, and the pole pieces 252 may be provided as shown in the reduction ratio table 600 of FIG. 17. Here, the reduction ratio represents a ratio of the number of revolutions per unit time of the second rotor 250 to the number of revolutions per unit time of the first rotor 230. In the reduction ratio table 600, $n_s$ represents the number of pole pieces 252, $p_1$ represents the number of dipoles of the outer permanent magnets 240, and $p_2$ represents the number of dipoles of the second inner permanent magnets 233. Here, the dipole represents a pair of the N pole and the S pole among the plurality of magnets.

The reduction ratio may vary depending on which is the stationary body ("Fixed") that is fixed and does not rotate, the input body ("Input") that receives magnetic flux from the coils 212u, 212v, 212w, and the output body ("Output") that rotates and generates the resultant rotational force. The reduction ratio may be determined as $p_1/p_2+1$ when the outer permanent magnets 240 are the stationary bodies, the second inner permanent magnets 233 are the input bodies, and the pole pieces 252 are the output bodies. The reduction ratio may be determined as $p_1/p_2$ when the pole pieces 252 are the stationary bodies, the second inner permanent magnets 233 are the input bodies, and the outer permanent magnets 240 are the output bodies. The reduction ratio may be determined as $p_2/p_1+1$ when the second inner permanent magnets 233 are the stationary bodies, the outer permanent magnets 240 are the input bodies, and the pole pieces 252 are the output bodies.

The above description illustrates that the outer permanent magnets 240, the second inner permanent magnets 233, and the pole pieces 252 are the stationary bodies, input bodies, and output bodies, respectively, but the pole pieces 252, the second inner permanent magnets 233, and the outer permanent magnets 240 may be the stationary bodies, input bodies, and output bodies, respectively, and the second inner permanent magnets 233, the outer permanent magnets 240, and the pole pieces 252 may be the stationary bodies, input bodies, and output bodies, respectively.

Referring to FIG. 18, as the second rotor 250 rotates, a rotational force T thereof may be outputted via the spindle 253. The rotational force of the plurality of pole pieces 252 may be concentrated on the base 251, and the spindle 253 may rotate together with the base 251 about the rotation axis Bx. The spindle 253 may be coupled to the shift unit 100 with or without the drive transmission medium 400, and as the spindle 253 rotates, the shift unit 100 may be rotated, thereby causing the shift unit 100 to be switched between the stage positions.

The base 251 of the second rotor 250 may cover a surface of the first rotor 230 that is perpendicular to the rotation axis Bx. In the present disclosure, the base 251 may be a paramagnet or a non-metal. Such a configuration may reduce the magnetic force by the first inner permanent magnets 232 provided in the first rotor 230 from acting on the shift unit 100.

Figure 19:
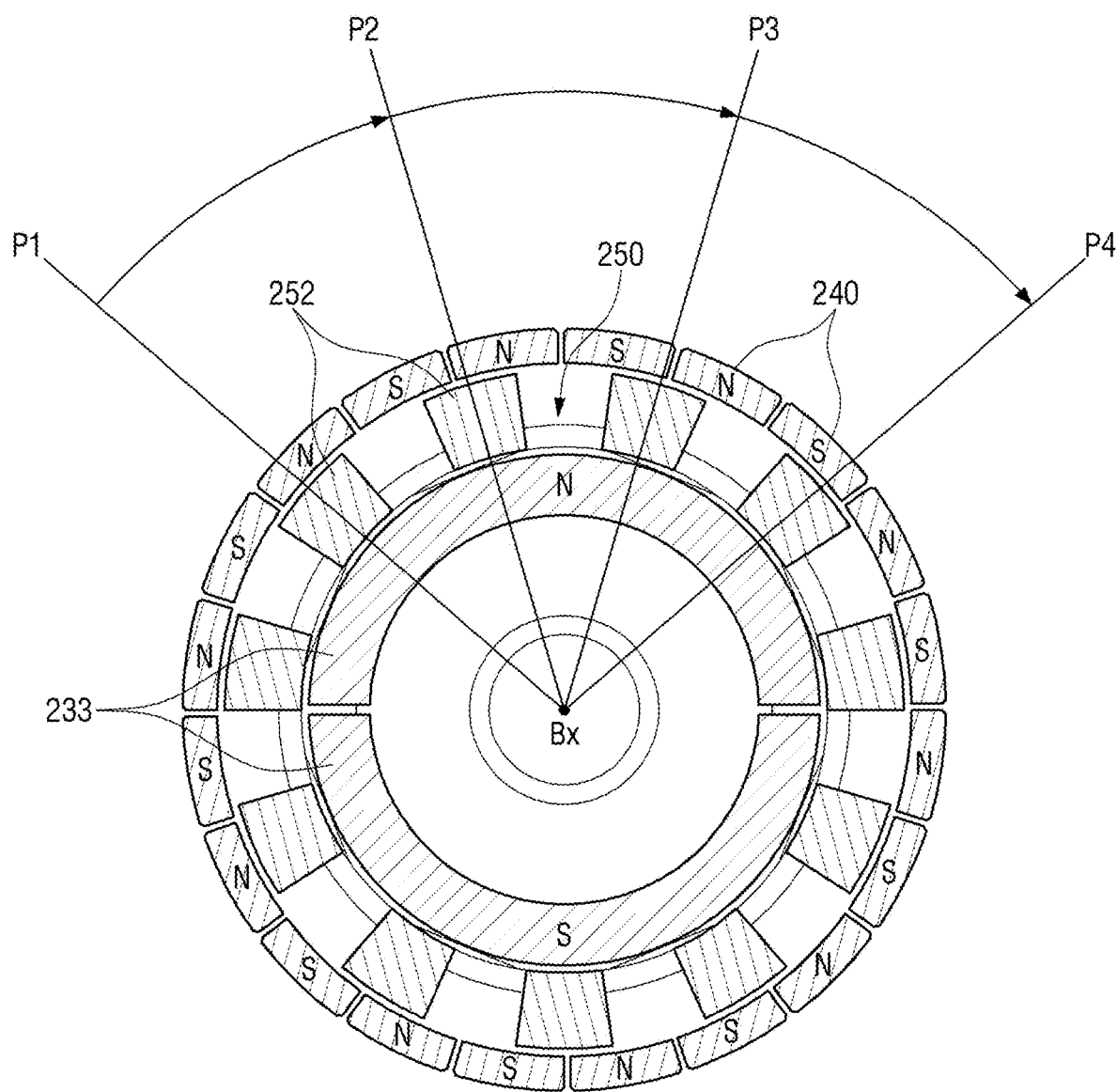
FIG. 19 is a view for explaining the manual rotation operation of the second rotor according to an embodiment of the present disclosure.

FIG. 19 is a view for explaining a manual rotation operation of the second rotor 250. Referring to FIG. 19, the second rotor 250 may rotate intermittently. When the first rotor 230 is stopped from rotating, the rotation of the second rotor 250 may be prevented by the magnetic force of the second inner permanent magnets 233 and the outer permanent magnets 240. Meanwhile, when a force greater than the magnetic force between the second inner permanent magnets 233 and the outer permanent magnets 240 is applied on the second rotor 250, the second rotor 250 may rotate intermittently. In this case, the second rotor 250 may perform intermittent rotation by a distance interval between the adjacent pole pieces 252. For example, when the number of the pole pieces 252 is 16, the second rotor 250 may perform intermittent rotation at an interval of 360/16=22.5 degrees.

Referring to FIG. 19, when a force greater than the magnetic force between the second inner permanent magnets 233 and the outer permanent magnets 240 is applied on the second rotor 250 that is fixed at the P1 position, the second rotor 250 may rotate to the P2 position. Likewise, the second rotor 250 stopped at the P2 position may be rotated to the P3 position and then rotated to the P4 position.

In the respective stop positions, the second rotor 250 may be prevented from rotating and fixed by the second inner permanent magnets 233 and the outer permanent magnets 240. The force of the second inner permanent magnets 233 and the outer permanent magnets 240 for preventing rotation of the second rotor 250 may be the strongest at the stop positions and may be weaker in other positions. For example, the force of the second inner permanent magnets 233 and the outer permanent magnets 240 for preventing rotation of the second rotor 250 may increase as each pole piece 252 approaches the stop positions.

Due to the different forces of the second inner permanent magnets 233 and the outer permanent magnets 240 acting on the second rotor 250 between the stop positions and the non-stop positions, the second rotor 250 may perform the intermittent rotation by an articulated distance interval between the pole pieces 252.

The second rotor 250 may be connected to the shift unit 100. When the user operates the shift unit 100 in the manual rotation mode, the shift unit 100 may, in turn, cause the second rotor 250 to perform intermittent rotation. Additionally, when the user's rotation of the shift unit 100 is stopped, the second rotor 250 may be fixed in place by the second inner permanent magnets 233 and the outer permanent magnets 240, which may also fix the shift unit 100 in place.

As described above, in response to the user's forced rotation of the shift unit 100, the second rotor 250 may perform the intermittent rotation. This enables the shift unit 100, when manually rotated by the user, to provide an intermittent shift feel by the driving unit 200. Accordingly, the user may rotate the shift unit 100 with a sense of intermittent force (e.g., a haptic feedback, an operational feeling, etc.).

In the present disclosure, the second rotor 250 may rotate along with the first rotor 230. With the clutch unit 260 provided between the first rotor 230 and the second rotor 250, a force that is applied to the second rotor 250 may be transferred by the clutch unit 260 to the first rotor 230 such that the first rotor 230 may rotate along with the second rotor 250. The power transmission relationship between the first rotor 230, the second rotor 250, and the clutch unit 260 will be described below with reference to FIGS. 23 to 25.

Further, FIG. 19 is a view showing a rotation pattern when the pole pieces 252 are the output bodies. When the outer permanent magnets 240 are the output bodies, they may perform intermittent rotation at a distance interval between adjacent outer permanent magnets 240.

Figure 20:
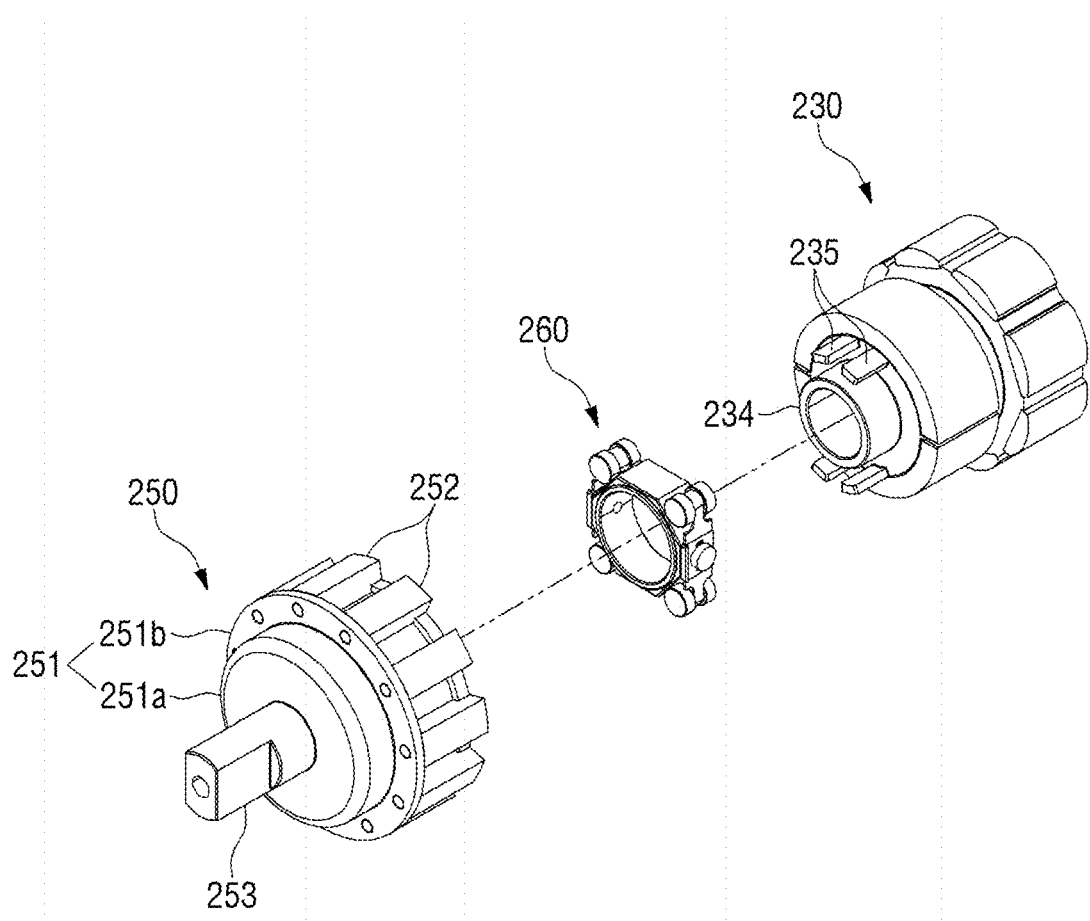
FIG. 20 is a view for explaining the coupling between the first rotor, the second rotor, and the clutch unit according to an embodiment of the present disclosure.
Figure 21:
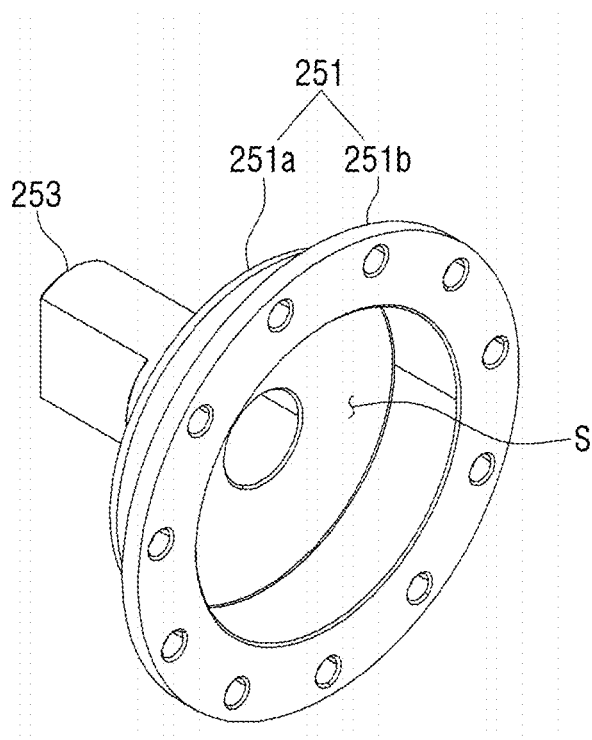
FIG. 21 is a rear perspective view of the base of the second rotor according to an embodiment of the present disclosure.
Figure 22:
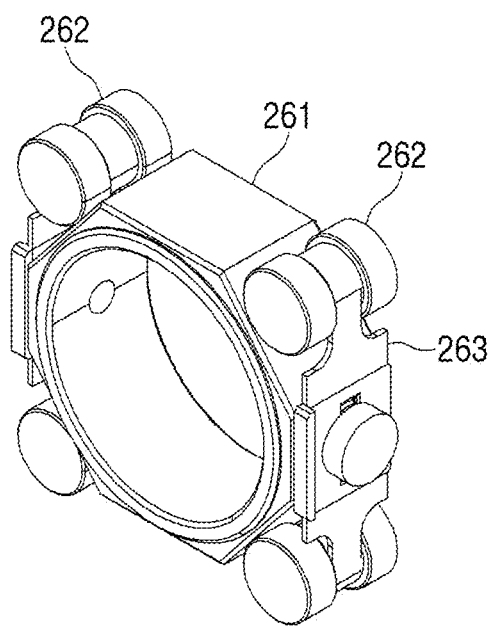
FIG. 22 is a view of a clutch unit according to an embodiment of the present disclosure.
Figure 23:
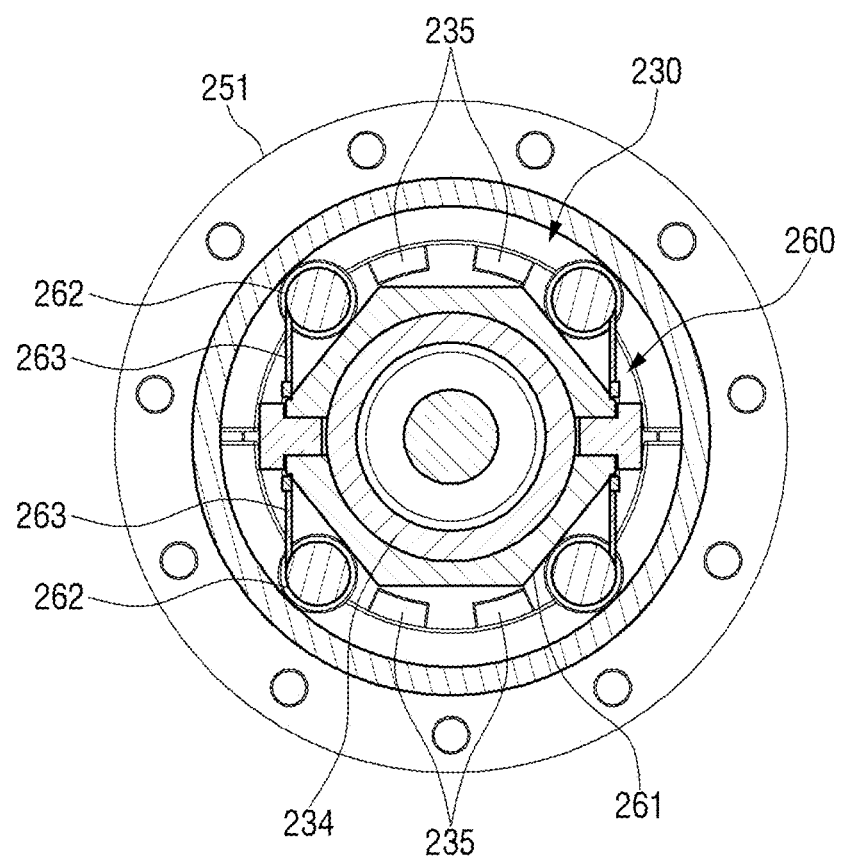
FIG. 23 is a view illustrating the clutch unit as installed between the first rotor and the second rotor according to an embodiment of the present disclosure.

FIG. 20 is a view for explaining the coupling between the first rotor 230, the second rotor 250, and the clutch unit 260, FIG. 21 a rear perspective view of the base 251 of the second rotor 250, FIG. 22 a view of the clutch unit 260, and FIG. 23 a view illustrating the clutch unit 260 as installed between the first rotor 230 and the second rotor 250. Referring to FIGS. 20 to 23, the first rotor 230, the second rotor 250, and the clutch unit 260 may be coupled to each other.

As shown in FIG. 21, the base 251 of the second rotor 250 may include a recessed space S. The clutch unit 260 may be accommodated in the recessed space S of the base 251. The recessed space S may be provided with a ring-shaped inner surface. The inner surface may be in close contact with rollers 262 of the clutch unit 260, and the mutual contact force between the inner surface of the base 251 and the rollers 262 of the clutch unit 260 may determine a friction force between the base 251 and the clutch unit 260.

The first rotor 230 may include a coupling ring 234 and catch portions 235. The coupling ring 234 may be formed to protrude in the shape of a ring from the rotating body 231 and may be coupled to the clutch unit 260. The clutch unit 260 may be coupled to the coupling ring 234 to be rotatable with respect to the first rotor 230.

The catch portions 235 may be formed to protrude from the rotating body 231. The catch portions 235 may serve to transfer the driving force to or from the rollers 262 of the clutch unit 260.

Referring to FIG. 22, the clutch unit 260 may include a base ring 261, the rollers 262, and an elastic part 263. The base ring 261 may be provided in the shape of a ring. The base ring 261 may be centrally formed with a through-hole and externally provided with a plurality of generally planar surfaces. A mechanical coupling may be established between the clutch unit 260 and the first rotor 230 by inserting the coupling ring 234 of the first rotor 230 into the clutch unit 260 through the through-hole. The rollers 262 may be seated on the outer surfaces of the base ring 261. Hereinafter, the outer surface of the base ring 261 on which each roller 262 is seated is referred to as a seating surface. The seating surface may provide a travel path for the roller 262. While being seated on the seating surface, the roller 262 may be movable along the seating surface. At this time, the roller 262 may move while rotating along the seating surface.

The rollers 262 may be disposed on the seating surfaces. The rollers 262 may be disposed between the base ring 261 of the clutch unit 260 and the second rotor 250. As described above, the rollers 262 may move along the seating surfaces, and the frictional force between the roller 262 and the second rotor 250 may vary depending on the position of the seating surface.

Elastic parts 263 may be provided on the base ring 261, and they may provide an elastic force to the rollers 262 against the base ring 261. Each elastic part 263 may be planar and elongated to one side. The elastic force may act in a direction perpendicular to one surface of the elastic part 263.

Referring to FIG. 23, the seating surfaces of the elastic parts 263 may each be inclined corresponding to the longitudinal direction of each elastic part 263 and to the travel path of each roller 262. One end of the elastic part 263 may be coupled to the base ring 261, and the other end thereof may provide an elastic force to the roller 262.

At least one roller 262 may be provided. The base ring 261 may include the seating surfaces, each providing a travel path for each roller 262. For example, one roller 262 may be seated on one seating surface. The roller 262 may be disposed between the inner surface of the second rotor 250 and its seating surface of the base ring 261. Accordingly, the roller 262 may be in contact with at least one of the inner surface of the second rotor 250 or its seating surface of the base ring 261. Where the inner surface of the second rotor 250 is curved and the seating surface of the base ring 261 is flat, the distance between the inner surface and the seating surface may be different along the travel path of the roller 262. For example, the distance from the center of the seating surface to the inner surface may be formed to be the greatest, and the distance from the edge of the seating surface to the inner surface may be formed to be the smallest. Accordingly, the frictional force between the roller 262 and the inner surface of the second rotor 250 may vary depending on the position of the seating surface on which the roller 262 is disposed.

The catch portions 235 of the first rotor 230 may be disposed with the rollers 262 adjacent in the circumferential direction placed therebetween. The catch portion 235 may be provided for each roller 262. As will be described below, the catch portion 235 may push the roller 262 to move it along the seating surface, which occurs when the push by the catch portion 235 on the roller 262 exceeds the elastic force of the elastic unit 263.

Figure 24:
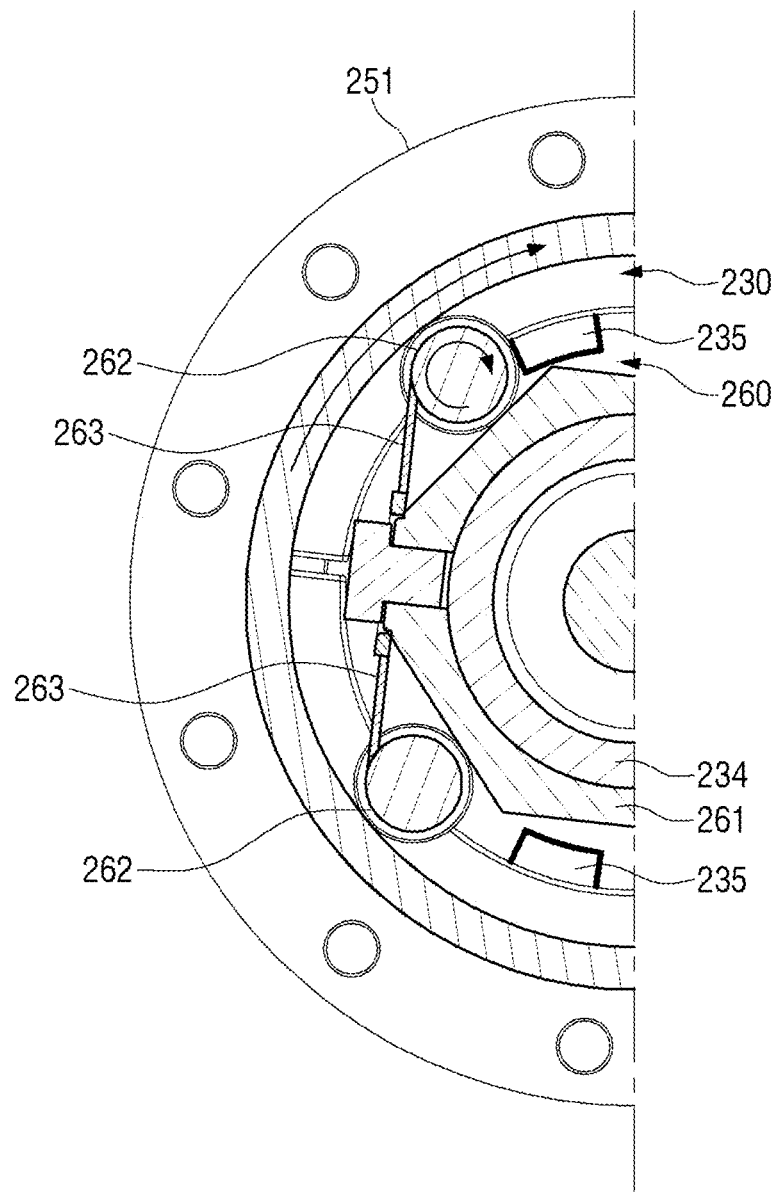
FIG. 24 is a view illustrating the clutch unit that transmits the rotational force of the second rotor to the first rotor according to an embodiment of the present disclosure.

FIG. 24 is a view illustrating the clutch unit 260 as transmitting the rotational force of the second rotor 250 to the first rotor 230. Referring to FIG. 24, when the second rotor 250 is rotated, at least one roller 262 is pushed by the second rotor 250 to move toward a spot where the seating surface and the inner surface of the second rotor 250 are spaced by decreasing distances.

At least one roller 262 may move along the seating surface by the rotation of the second rotor 250. Referring to FIG. 24, when the second rotor 250 rotates clockwise, the upper roller 262 may move along the seating surface by the rotation of the second rotor 250. The following will be described with the upper roller 262 as a reference.

When the driver manipulates the shift lever 120 to rotate the second rotor 250, the roller 262 that is in contact with the inner surface of the second rotor 250 may rotate and move along the seating surface. At this time, the roller 262 may move to a point where the distance between the seating surface and the inner surface of the second rotor 250 decreases. For example, the roller 262 may move toward the edge of the seating surface. In this case, the frictional force between the roller 262 and the second rotor 250 may increase, and the clutch unit 260 may rotate in unison with the second rotor 250.

As the clutch unit 260 rotates, the roller 262 may rotate about the rotation shaft Bx, and the roller 262 may push the catch portion 235 of the first rotor 230. When the rotational force of the second rotor 250 is transmitted to the catch portion 235 through the roller 262, the first rotor 230 may also rotate. As a result, when the second rotor 250 is rotated by the driver, the first rotor 230 may rotate along with the second rotor 250. At this time, the first rotor 230 and the second rotor 250 may rotate at the same speed.

When the driver manipulates the shift lever 120 to rotate the second rotor 250, as the first rotor 230 corotates with the second rotor 250, the shift lever 120 may be subject to a resistive force which may provide the drive with a shift feel.

The roller 262 disposed at the lower side in FIG. 24 may be hardly affected by the rotation of the second rotor 250. When the second rotor 250 rotates in the clockwise direction, the lower roller 262 may move toward the center of its seating surface. In this case, the decreasing frictional force between the roller 262 and the second rotor 250 may leave the roller 262 unaffected by the rotation of the second rotor 250.

The above description concerns the relationship between two of the four rollers 262 provided in the clutch unit 260 and the second rotor 250, but the other two rollers 262 may operate similarly.

Figure 25:
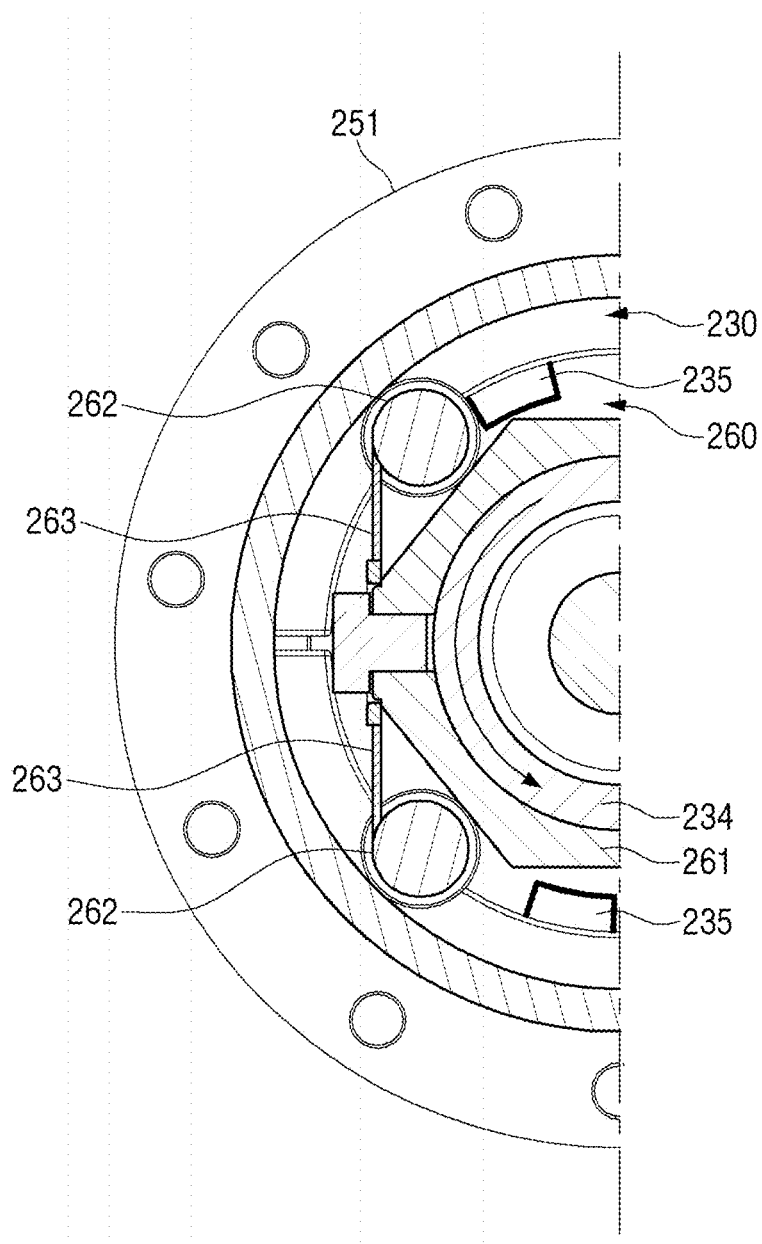
FIG. 25 is a diagram illustrating that the first rotor renders friction to be removed or reduced between the clutch unit and the second rotor according to an embodiment of the present disclosure.

FIG. 25 is a view illustrating that the first rotor 230 renders the friction to be removed or reduced between the clutch unit 260 and the second rotor 250. Referring to FIG. 25, when the first rotor 230 rotates, at least one roller 262 may be pushed by the catch portion 235 and move to a point where the distance increases between its seating surface and the inner surface of the second rotor 250.

Referring to FIG. 25, when the first rotor 230 rotates counterclockwise, the upper roller 262 may move along the seating surface by the rotation of the first rotor 230. The following description is given with respect to the upper roller 262.

When the first rotor 230 rotates counterclockwise, the catch portion 235 may push the roller 262. When the force of the catch portion 235 is greater than the elastic force of the elastic part 263, the roller 262 may move along the seating surface. The roller 262 that moves along the seating surface may part from the inner surface of the second rotor 250, which prevents the rotational force of the first rotor 230 from being transmitted via the clutch unit 260 to the second rotor 250. This means that the second rotor 250 may rotate exclusively by the mutual magnetic force between the first rotor 230 and the outer permanent magnets 240 irrespective of the clutch unit 260.

The transmission 10 for a vehicle according to some embodiments of the present disclosure may provide an automatic parking stage repositioning function (RTP; Return To Park). The automatic parking-stage repositioning indicates a function by which the shift unit 100 is automatically repositioned to the parking stage (P stage) or switched to the stowed position. For example, when the vehicle is turned off while the shift unit 100 is at a non-parking stage, the transmission 10 may cause the shift unit 100 to be repositioned to the parking stage (P stage) and/or switched to the stowed position.

With the automatic parking stage repositioning function, the second rotor 250 connected to the shift lever 120 may be rotated. To rotate the second rotor 250, the first rotor 230 may be rotated. The clutch unit 260, which is disposed between the first rotor 230 and the second rotor 250, preferably distances itself from attenuating the rotational force of the first rotor 230. As described above, when the first rotor 230 rotates, since the rollers 262 of the clutch unit 260 part from the second rotor 250, the rotational force of the first rotor 230 may be applied to the second rotor 250 unattenuated by the clutch unit 260.

Figure 26:
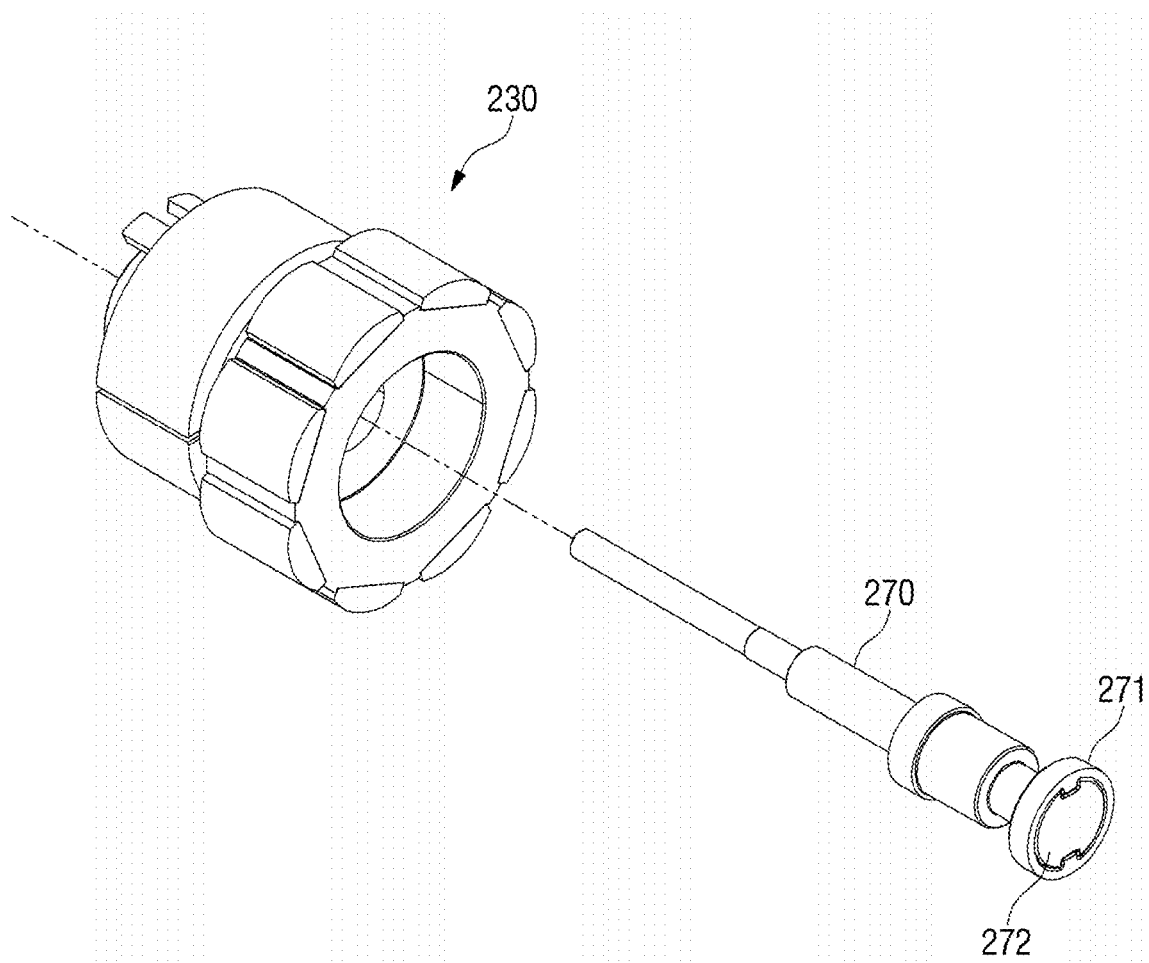
FIG. 26 is a diagram illustrating the coupling between the first rotor and a rotor shaft according to an embodiment of the present disclosure.
Figure 27:
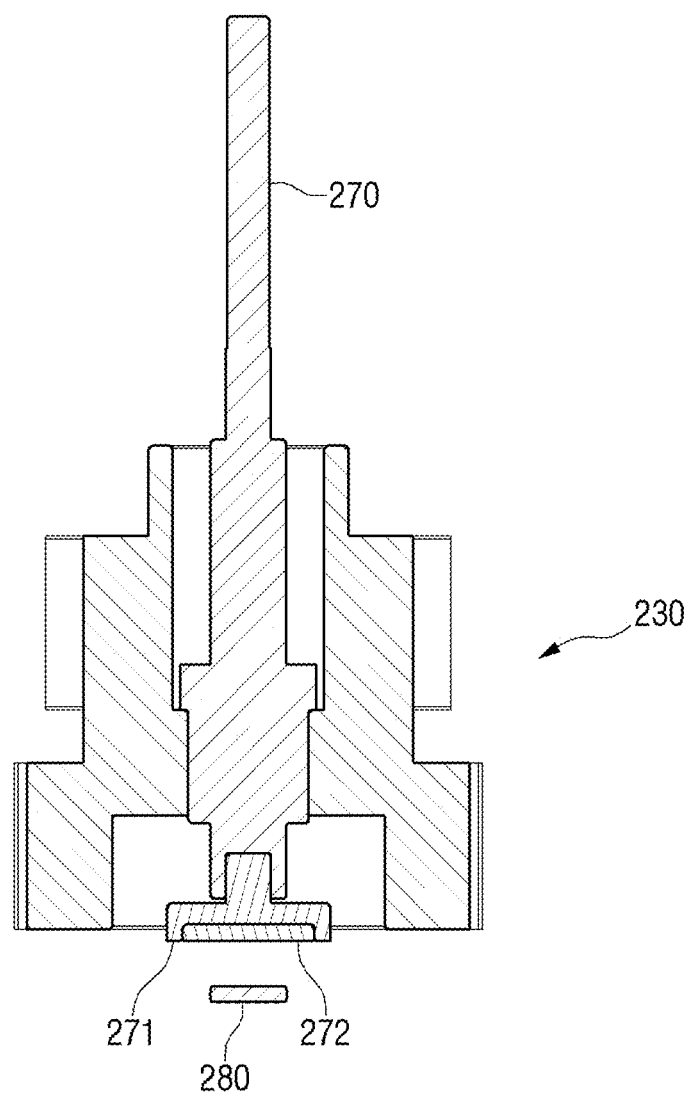
FIG. 27 is a diagram illustrating a magnetic sensor that detects the rotation angle of the first rotor according to an embodiment of the present disclosure.

FIG. 26 is a view illustrating the coupling between the first rotor 230 and a rotor shaft 270, and FIG. 27 is a view illustrating a magnetic sensor 280 that detects the rotation angle of the first rotor 230. Referring to FIGS. 26 and 27, the first rotor 230 may be coupled to the rotor shaft 270 elongated along the rotation axis Bx.

The rotor shaft 270 may be coupled to and corotate with the first rotor 230. A magnet holder 271 may be provided on the rotor shaft 270. A magnetic substance 272 may be supported by the magnet holder 271. The magnetic substance 272 may generate a magnetic force. The magnetic force generated by the magnetic substance 272 may be detected by the magnetic sensor 280.

The magnetic sensor 280 may detect the rotation angle of the first rotor 230 by using the magnetic force distribution of the magnetic substance 272. For example, the magnetic sensor 280 may output the rotation angle of the first rotor 230 as a linear signal. Since the linear signal includes continuous rotation angles based on the positions of the first rotor 230, the transmission according to the present disclosure may detect the rotation angles of the first rotor 230 by using the data outputted by the magnetic sensor 280.

In some embodiments, the magnetic sensor 280 may be provided separately from the first rotor 230. For example, the magnetic sensor 280 may be fixed to a housing (not shown) enclosing the driving unit 200. When the first rotor 230 rotates, the magnetic substance 272 may rotate with respect to the magnetic sensor 280, and the magnetic force distribution detected by the magnetic sensor 280 may vary. The magnetic sensor 280 may utilize the magnetic force distribution to detect the rotation angle of the first rotor 230.

The rotation angle of the first rotor 230 that is detected by the magnetic sensor 280 may be transmitted to the controller 300 which then may rotate the first rotor 230 by referring to the rotation angle of the first rotor 230.

Figure 28:
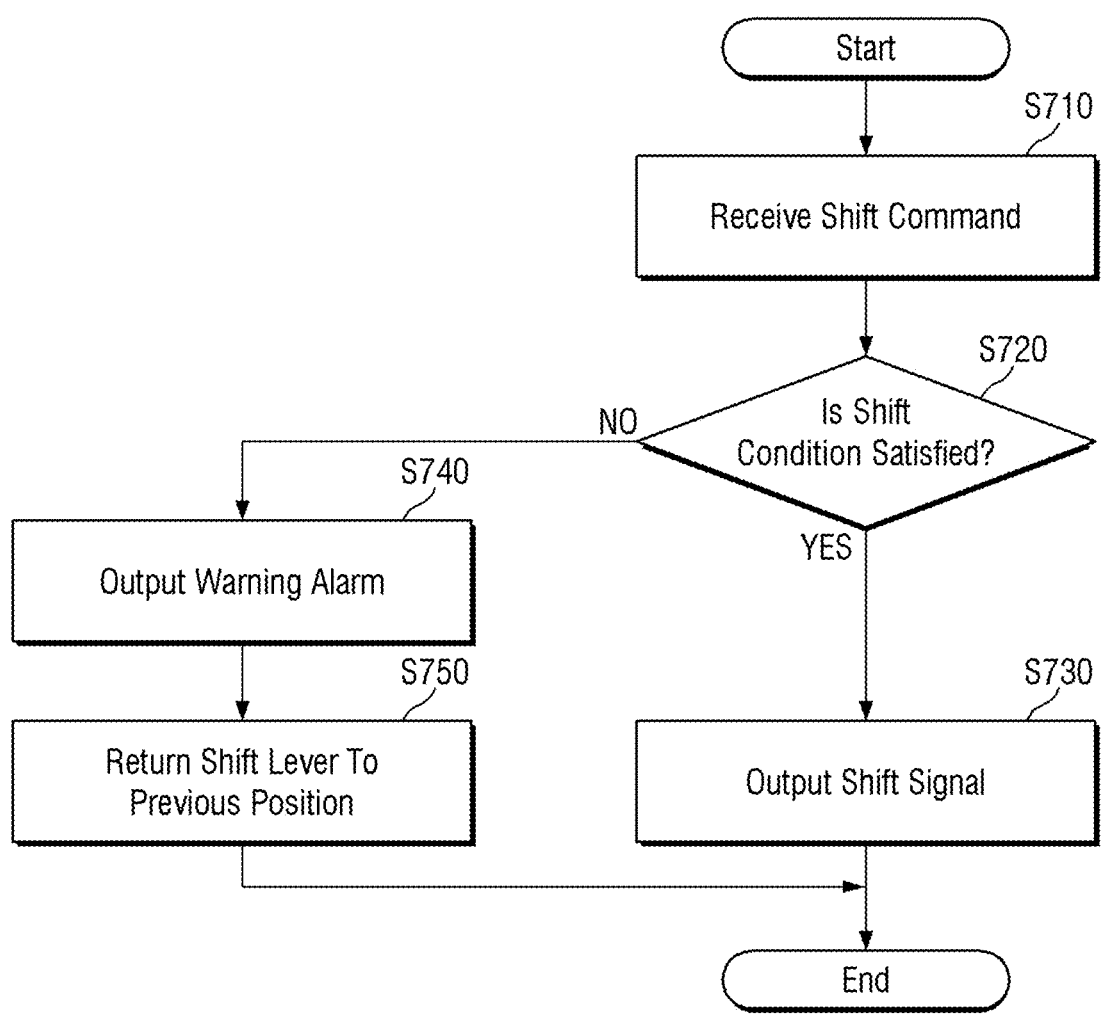
FIG. 28 is a flowchart of a method of outputting a shift signal by a controller according to an embodiment of the present disclosure.

FIG. 28 is a flowchart for a method of outputting a shift signal by the controller 300. Referring to FIG. 28, the controller 300 may be configured to output a shift signal that corresponds to the input shift command. The driver may input a shift command of the vehicle by using the shift unit 100. The controller 300 may be configured to receive the shift command (S710). The controller 300 may be configured to determine whether the received shift command satisfies a shift condition (S720). For example, the controller 300 may be configured to determine whether the received shift command is by the driver's intention or by mistake.

The controller 300 may be configured to determine whether the shift condition is satisfied by referring to the driving state of the vehicle. Additionally, the controller 300 may be configured to determine whether the shift condition is satisfied by referring to at least one of an operation angle of a brake pedal and a driving speed of the vehicle.

For example, the controller 300 may be configured to determine that the shift condition is not satisfied upon receiving a shift command toward the drive stage or reverse stage when the gear shift stage of the vehicle is the parking stage with the operation angle of the brake pedal being less than or equal to a threshold angle. Alternatively, the controller 300 may be configured to determine that the shift condition is not satisfied upon receiving a shift command toward the reverse stage or the parking stage when the gear shift stage of the vehicle is the drive stage with the driving speed of the vehicle exceeding a threshold speed.

When the shift condition is satisfied, the controller 300 may be configured to output a shift signal (S730). For example, the controller 300 may be configured to output a shift signal once the shift unit 100 is switched from the first shift stage position to the second shift stage position and when the shift condition is satisfied. The outputted shift signal may be transmitted to a transmission (not shown) to change the shift stage.

On the other hand, when the shift condition is not satisfied, the controller 300 may be configured to prevented from outputting a shift signal. For example, the controller 300 may be configured to output a warning alarm once the shift unit 100 is switched from the first shift stage position to the second shift stage position and when the shift condition is not satisfied (S740).

Additionally, when the shift condition is not satisfied, the controller 300 may be configured to return the shift lever 120 to the previous position (S750). For example, once the shift unit 100 is switched from the first shift stage position to the second shift stage position and when the shift condition is not satisfied, the controller 300 may be configured to control the driving unit 200 causing the shift lever 120 to be switched to the first shift stage position.

As described above, due to the controller 300 configured to operate by taking account of the shifting condition, an inadvertent or unintended input of shift command of the shift unit 100 by the driver may be prevented from causing the shift unit 100 to perform a transmission operation, thereby ensuring a more reliable vehicle operation.

According to embodiments of the present disclosure, the transmission for a vehicle as described above has advantages as follows.

First, with the non-contact type driving unit used, the transmission can reduce the noise due to rotation and provide the user with an improved shift feel. Second, no separate part is required in implementing an automatic return-to-park (RTP) function. Third, by employing a two-way clutch, the transmission can provide the user with an improved shift feel while implementing the RTP function. Fourth, by comparing the driving state of the vehicle and the shift operation, the transmission can determine whether the shift operation is incorrect such that safer driving of the vehicle may be facilitated. Fifth, the transmission can precisely control the driving unit by detecting an accurate rotation angle of the rotor shaft by using a magnetic sensor.

However, the effects of the embodiments are not restricted to the ones set forth herein. The above and other effects of the embodiments will become more apparent to one of daily skill in the art to which the embodiments pertain by referencing the claims.

What is claimed is:

1. A transmission for a vehicle, comprising:
   a transmission shift unit that receives a shift command of the vehicle;
   a driving unit that generates a driving force for causing the transmission shift unit to be switched between positions; and
   a controller configured to control the driving unit for causing the transmission shift unit to be switched between the positions depending on whether a preset condition is satisfied,
   wherein the driving unit comprises:
      a first stator that generates magnetic flux,
      a first rotor including first inner permanent magnets and second inner permanent magnets that are disposed circumferentially at regular intervals along a rotational axis, and configured to be rotated by the magnetic flux transmitted to the first inner permanent magnets,
      outer permanent magnets that are provided in a different number than the second inner permanent magnets,
      a second rotor disposed between the second inner permanent magnets and the outer permanent magnets, and
      a clutch unit disposed between the first rotor and the second rotor.

2. The transmission of claim 1, wherein the clutch unit comprises:
   a base ring;
   one or more rollers disposed between the base ring and the second rotor; and
   one or more elastic parts provided on the base ring and configured to provide an elastic force to the rollers with respect to the base ring.

3. The transmission of claim 2, wherein the base ring includes seating surfaces configured to seat the rollers and to provide travel paths of the rollers,
   wherein each of the elastic parts is planar and elongated, and
   wherein each of the seating surfaces is inclined corresponding to a longitudinal direction of each elastic part and a travel path of each roller.

4. The transmission of claim 2, wherein the base ring includes seating surfaces configured to seat the one or more rollers and to provide the rollers with travel paths, respectively, and
   wherein each of the one or more rollers is pushed by the second rotor when rotating, toward a spot where the seating surface and an inner surface of the second rotor are spaced by decreasing distances.

5. The transmission of claim 4, wherein the first rotor comprises:
   a rotating body and catch portions that protrude from the rotating body,
   wherein the first rotor is rotated by a rotational force of the second rotor transmitted to the catch portions through the rollers.

6. The transmission of claim 4, wherein the first rotor comprises:
- a rotating body and catch portions that protrude from the rotating body,
- wherein each of the one or more rollers is pushed by the catch portions when the first rotor rotates, toward a spot where the seating surface and the inner surface of the second rotor are spaced by increasing distances.

7. The transmission of claim 5, wherein the catch portions are disposed circumferentially, each being disposed between adjacent ones of the rollers.

8. The transmission of claim 1, wherein the first rotor is coupled to a rotor shaft formed elongated along a rotation axis, the rotor shaft being provided with a magnet holder that is configured to hold a magnetic substance.

9. The transmission of claim 8, further comprising:
- a magnetic sensor that detects a rotation angle of the first rotor by using a magnetic force distribution of the magnetic substance.

10. The transmission of claim 1, wherein the controller is configured to:
- control the driving unit to cause the shift unit to be switched to a parking stage position when a parking condition is satisfied; and
- control the driving unit to cause the shift unit to be switched to a stowed position when a stowing condition is satisfied.

11. The transmission of claim 10, wherein the stowing condition comprises:
- at least one of turning off the vehicle or a user command input.

12. The transmission of claim 1, wherein the controller is configured to control, in response to the shift unit being switched from a first shift stage position to a second shift stage position when a shift condition is not satisfied, the driving unit to cause the shift unit to be switched to the first shift stage position.

13. The transmission of claim 12, wherein the controller is configured to output a warning alarm in response to the shift unit being switched from the first shift stage position to the second shift stage position when the shift condition is not satisfied.

14. The transmission of claim 12, wherein the controller is configured to determine whether the shift condition is satisfied by referring to at least one of an operation angle of a brake pedal or a driving speed of the vehicle.

15. The transmission of claim 1, wherein the second rotor is configured to be intermittently rotated in response to being subjected to a force greater than a magnetic force between the second inner permanent magnets and the outer permanent magnets.

* * * * *